(12) United States Patent
Proctor, Jr. et al.

(10) Patent No.: US 10,057,700 B2
(45) Date of Patent: *Aug. 21, 2018

(54) SMART HUB

(71) Applicant: Proctor Consulting LLP, Indialantic, FL (US)

(72) Inventors: James A. Proctor, Jr., Indialantic, FL (US); James Arthur Proctor, III, Indialantic, FL (US)

(73) Assignee: PROCTOR CONSULTING LLP, Indialantic, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,142

(22) Filed: Jan. 6, 2017

(65) Prior Publication Data

US 2017/0180899 A1     Jun. 22, 2017

Related U.S. Application Data

(63) Continuation of application No. 14/597,863, filed on Jan. 15, 2015, now Pat. No. 9,554,061.

(60) Provisional application No. 61/928,583, filed on Jan. 17, 2014.

(51) Int. Cl.
| | |
|---|---|
| *G06F 15/173* | (2006.01) |
| *H04R 29/00* | (2006.01) |
| *H04R 27/00* | (2006.01) |
| *G06F 3/16* | (2006.01) |
| *H04W 4/00* | (2018.01) |
| *H04W 4/80* | (2018.01) |

(52) U.S. Cl.
CPC ............ *H04R 29/007* (2013.01); *G06F 3/165* (2013.01); *H04R 27/00* (2013.01); *H04W 4/008* (2013.01); *H04W 4/80* (2018.02); *H04R 2227/003* (2013.01)

(58) Field of Classification Search
CPC ............ H04L 12/2834; H04L 12/2838; H04N 21/4126; H04S 7/00; H04S 7/303
USPC ......................................................... 709/238
See application file for complete search history.

(56) References Cited

U.S. PATENT DOCUMENTS

| | | | |
|---|---|---|---|
| 5,778,077 | A | 7/1998 | Davidson |
| 7,936,736 | B2 | 5/2011 | Proctor, Jr. et al. |
| 8,090,359 | B2 | 1/2012 | Proctor, Jr. et al. |
| 8,090,616 | B2 | 1/2012 | Proctor, Jr. et al. |
| 8,116,749 | B2 | 2/2012 | Proctor, Jr. et al. |
| 8,369,842 | B2 | 2/2013 | Proctor, Jr. et al. |
| 8,370,955 | B2 | 2/2013 | Proctor, Jr. et al. |
| 8,374,592 | B2 | 2/2013 | Proctor, Jr. et al. |
| 8,385,896 | B2 | 2/2013 | Proctor, Jr. et al. |
| 8,385,913 | B2 | 2/2013 | Proctor, Jr. et al. |
| 8,849,698 | B2 | 9/2014 | Proctor, Jr. et al. |
| 2006/0029015 | A1 | 2/2006 | Hinsey |
| 2007/0073935 | A1 | 3/2007 | Kim |

(Continued)

OTHER PUBLICATIONS

U.S. Appl. No. 13/449,208, filed Apr. 17, 2012 for Proximity Detection, Virtual Detection, or Location Based Triggering of the Exchange of Value and Information by James Proctor, Jr. et al., 76 pages.

(Continued)

*Primary Examiner* — James E Springer
(74) *Attorney, Agent, or Firm* — VLP Law Group LLP

(57) ABSTRACT

An intelligent hub for interfacing with other devices and performing smart audio or video source selection.

18 Claims, 10 Drawing Sheets

(56) References Cited

U.S. PATENT DOCUMENTS

| | | | |
|---|---|---|---|
| 2007/0162185 A1* | 7/2007 | McFarland | G01S 5/0289 700/258 |
| 2008/0081664 A1 | 4/2008 | Azada | |
| 2008/0107297 A1 | 5/2008 | Fischer | |
| 2008/0141317 A1 | 6/2008 | Radloff | |
| 2008/0290970 A1 | 11/2008 | DeBusk | |
| 2009/0323991 A1 | 12/2009 | Hudson | |
| 2010/0103316 A1 | 4/2010 | Colsey | |
| 2010/0107185 A1 | 4/2010 | Shintani | |
| 2010/0156624 A1 | 6/2010 | Hounsell | |
| 2010/0162324 A1 | 6/2010 | Mehta | |
| 2010/0333137 A1 | 12/2010 | Hamano | |
| 2011/0099572 A1 | 4/2011 | Craner | |
| 2011/0211584 A1 | 9/2011 | Mahmoud | |
| 2011/0314503 A1 | 12/2011 | Ruiz-Velasco | |
| 2012/0210349 A1 | 8/2012 | Campana | |
| 2012/0311633 A1 | 12/2012 | Mandrekar | |
| 2013/0083662 A1 | 4/2013 | Rappaport | |
| 2013/0133087 A1 | 5/2013 | Proctor, Jr. et al. | |
| 2013/0144915 A1 | 6/2013 | Ravi | |
| 2013/0178227 A1* | 7/2013 | Vartanian | G01S 15/08 455/456.1 |
| 2013/0231044 A1 | 9/2013 | Wang | |
| 2013/0336094 A1* | 12/2013 | Gruteser | G01S 11/14 367/117 |
| 2014/0003622 A1 | 1/2014 | Ikizyan | |
| 2014/0026201 A1 | 1/2014 | Srinivasan | |
| 2014/0079242 A1* | 3/2014 | Nguyen | H04R 5/00 381/86 |
| 2014/0098240 A1 | 4/2014 | Dimitriadis | |
| 2014/0161265 A1 | 6/2014 | Chaikin | |
| 2014/0331265 A1 | 11/2014 | Mozell | |
| 2014/0344855 A1 | 11/2014 | Morrow | |
| 2015/0029880 A1 | 1/2015 | Burns | |
| 2015/0086041 A1 | 3/2015 | Reimann | |
| 2015/0264502 A1 | 9/2015 | Aoki | |
| 2017/0013258 A1* | 1/2017 | Vilermo | H04S 7/302 |
| 2017/0099720 A1* | 4/2017 | Ogawa | H05B 37/0272 |
| 2017/0366898 A1* | 12/2017 | Melanson | H04R 1/1041 |

OTHER PUBLICATIONS

U.S. Appl. No. 60/874,992, filed Apr. 17, 2012 for Proximity Detection, Virtual Detection, or Location Based Triggering of the Exchange of Value and Information by James Proctor, Jr. et al., 76 pages.

* cited by examiner

Smart Hub Processing

Mobile Remote Application Processing

Smart Hub Server Application Processing

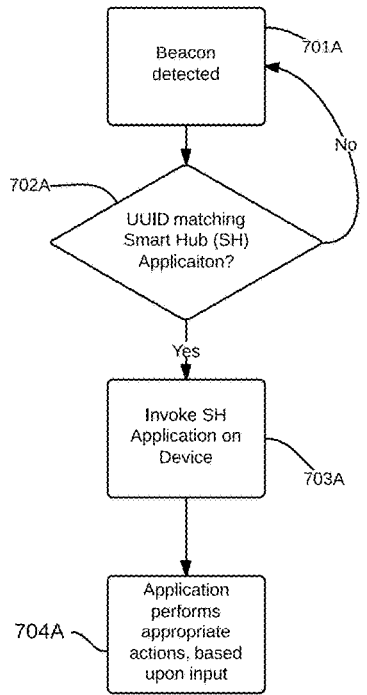

Figure 7A

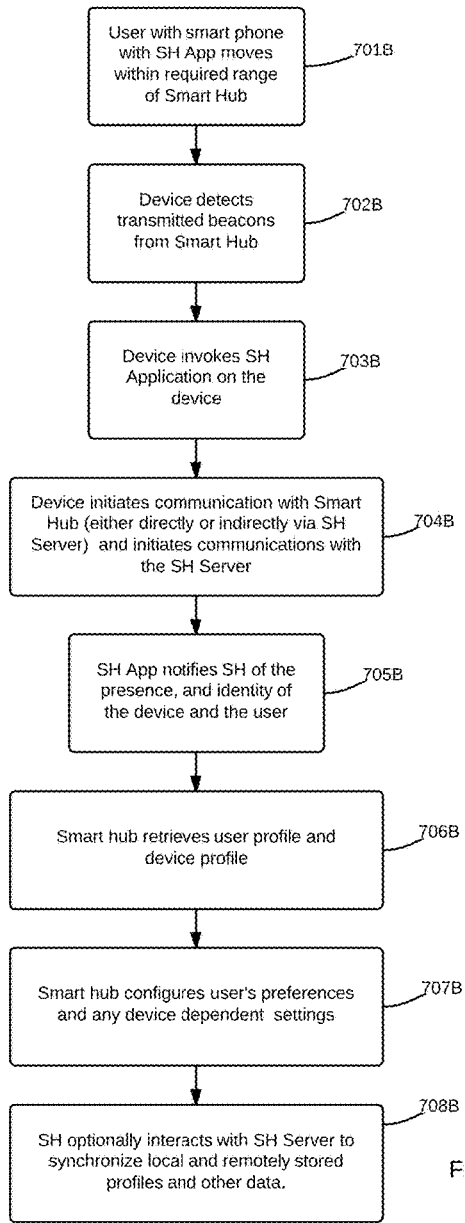

Figure 7B

SH Interacts with SH App to perform services
which may include one or more of:
A) Control of Smart Hub, B) Personalized Volume Control, C) "Second Screen" content related to displayed program (twitter feeds, user polls, chat, show details, IMdb, merchandise, advertising, fan clubs, facebook, chat with others detected watching the same show on another SH, etc), D) Streaming audio to the user's device speaker or headphone jack (synchronized with the video at the SH and/or audio received at the device's mic - via equalization), E) Acoustic Location of the User Device, F) Adaptive Acoustic Equalization, G) Smart Volume Control, H) automatic and/or customized predictive content source selection by the hub for display on a HD monitor, and/or HS device, I) remotely control the local devices providing or receiving content from the smart hub device, J) automatically pause the content shown by the SH, when the device (with SH App) leaves the room or proximal detection (determined using acoustics and / or bluetooth beacons), K) parental control configuration or enforcement based upon identify of users present in the room (or proximity), L) control of home network admission for guests, M) other services.

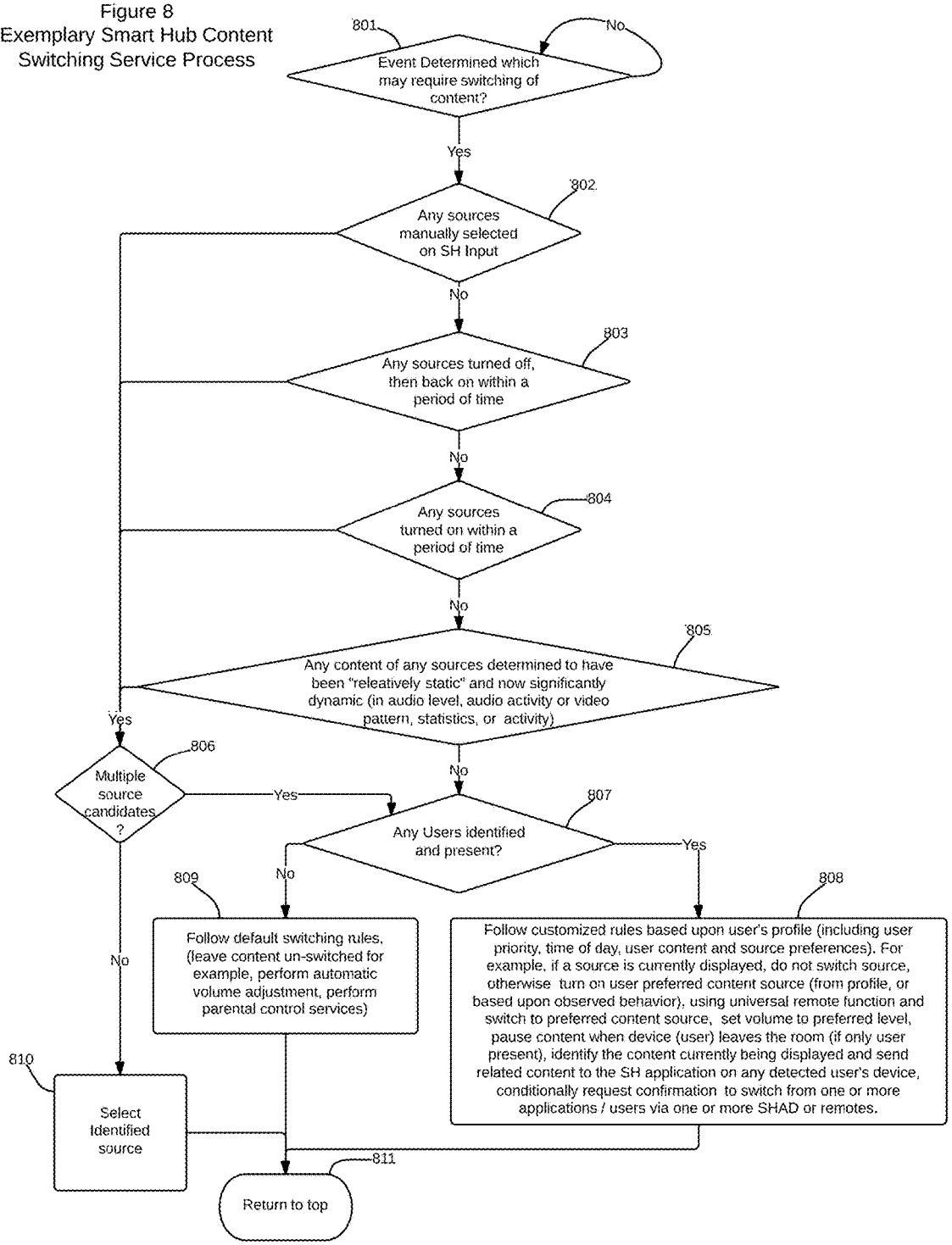

Exemplary Illustration utilizing combined Acoustic and RF Processing

Exemplary processes utilizing combined Acoustic and RF Processing for the determination of Acoustic channel state information (CSI)

Smart Hub Universal Remote Extender (SHURE)

SMART HUB

CROSS REFERENCE TO RELATED APPLICATIONS

The present application is a continuation of U.S. patent application Ser. No. 14/597,863, which was filed on Jan. 15, 2015, by James A. Proctor, Jr. for a SMART HUB and claims the benefit of U.S. Provisional Patent Application Ser. No. 61/928,583, which was filed on Jan. 17, 2014, by James A. Proctor, Jr. for a SMART HUB and is hereby incorporated by reference.

This application is related to the following issued U.S. Pat. Nos. 8,385,913; 8,090,616; 7,936,736; 8,090,359; 8,116,749; 8,370,955; 8,385,896; 8,374,592; and 8,369,842 and is also related to the following pending U.S. patent applications: Ser. No. 13/744,457 filed Jan. 18, 2013; Ser. No. 13/775,435 filed Feb. 25, 2013; Ser. No. 13/449,208 filed Apr. 17, 2012 and U.S. Provisional Application Ser. No. 60/874,992 filed Dec. 15, 2006 now expired, entitled "Wireless event indication system and method". The entire contents of the above-referenced patents and patent applications are hereby incorporated by reference.

SUMMARY

This application relates to a smart hub.

BRIEF DESCRIPTION OF THE DRAWINGS

The details will be apparent from the following more particular description of example embodiments, as illustrated in the accompanying drawings in which like reference characters refer to the same parts through the different views. The drawings are not necessarily to scale, emphasis instead being placed upon illustrating embodiments.

FIG. 7A is an example flow diagram of a smart hub application device (SHAD) embodiment detecting the presence of a smart hub (SH) or a related devices (such as a smart but universal remote extender, or the another device) and invoking an embodiment of a smart hub interface application.

FIG. 7B is an example system level flow diagram of a smart hub system embodiment wherein a user with a smart hub application device (SHAD) embodiment comes into range of a smart hub embodiment to perform example services.

FIG. 8 is an example system level flow diagram of a smart hub embodiment performing a embodiment of a source switching process.

DETAILED DESCRIPTION OF THE DRAWINGS

Figure 1:
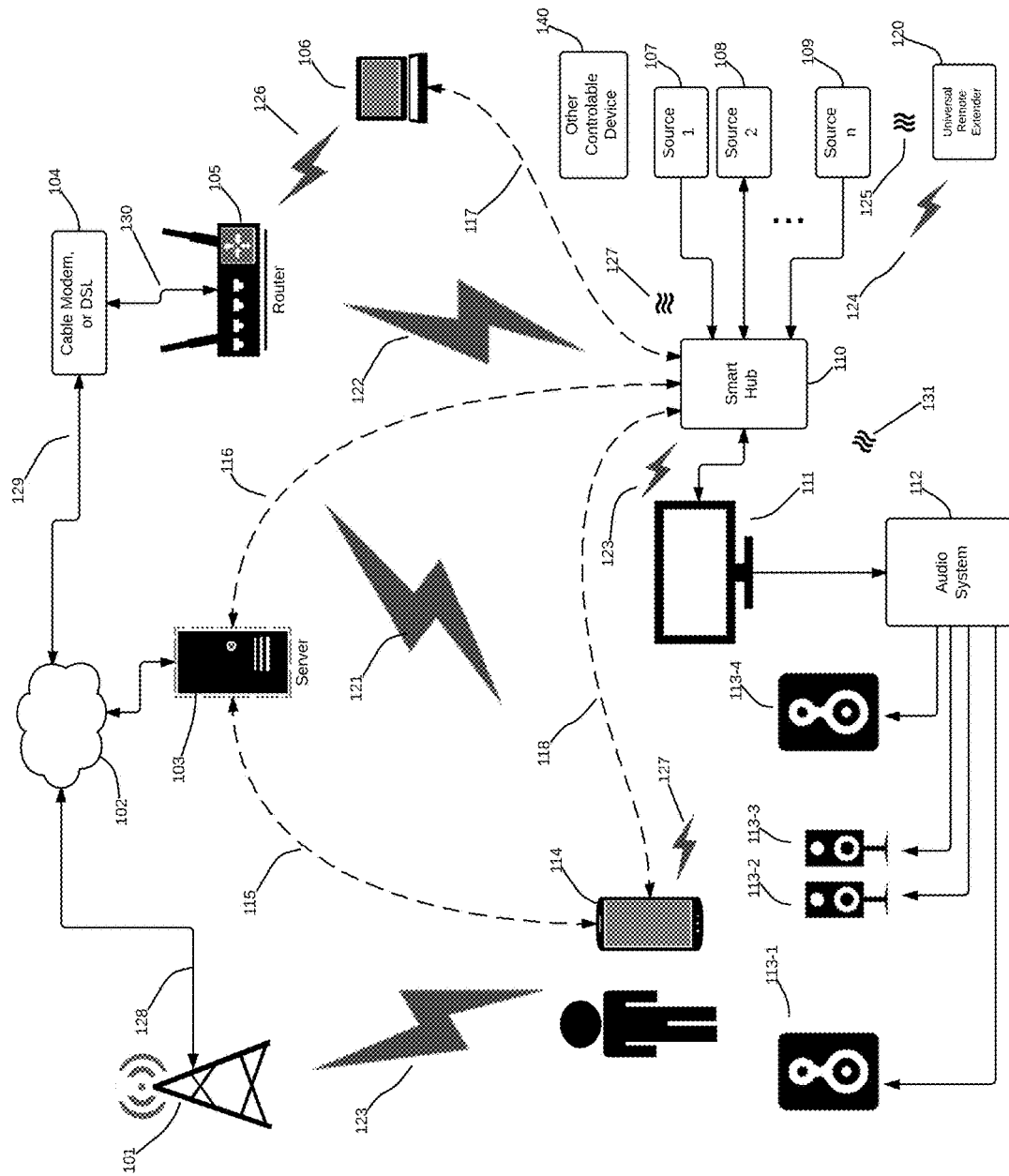
FIG. 1 is an example system diagram of a preferred embodiment.

FIG. 1 is an example system diagram of a preferred embodiment.

Referring to FIG. 1, an example embodiment of a smart hub system is depicted. The Smart hub 110, in the current embodiment, is configured to perform a number of functions and communicate with a variety of other devices and network entities. For example the smart hub 110, in the current embodiment, is in communication with a local computer or local server 103 utilizing application communication link 117. It should be understood that application communication link 117 may be performed utilizing any combination of wired and/or wireless physical communication links such as utilizing wired Institute of Electrical and Electronic Engineers (IEEE) 803.2 Local Area Network (LAN) connections, 802.11 Wireless Fidelity (Wi-Fi) connections, Bluetooth® connections, and the link. The individual physical communication links may further be directly between the smart hub 127 and the local server 103 (such as would be the case with so-called Wi-Fi Direct®), or may utilize intermediary network nodes such as router 105.

Likewise, application communication link 116 between the smart hub 110 and a smart hub cloud server at cloud 102 may be enabled by any number of individual communications paths, such as utilizing cellular mobile communications via base station 101, wireless and wired router 105, Wi-Fi direct, Bluetooth, Near Field Communications (NFC), Ultra Wideband (UWB) or the like. While wired LAN connections to the router 105 are not depicted in FIG. 1, such connections are contemplated and may be used in various embodiments. In one embodiment, communications between the smart hub cloud server (SHCS) and the smart hub (SH) via application communication link 116 are performed utilizing a smart hub application device (SHAD) as an intermediary and utilizing individual communications capabilities in between the SHAD 114 and the SHCS, as well utilizing individual communications capabilities in between the SHAD 114 and the SH 110. In embodiments, application link 116 may be tunneled through application links 118 and 115, or application link 116 may be simply routed or forwarded utilizing the physical communication capabilities of the SHAD 114, or another intermediate device such as router 105. In one embodiment the SHAD utilizes a local wireless link 127 utilizing Bluetooth high-speed (BT-HS) or Bluetooth LE (low energy), standard Bluetooth in one embodiment, or 802.11 Wi-Fi between the SH and a SHAD 114 (in one embodiment being a smart phone which is running a smart hub application) and forwards or otherwise enables messaging in-between the SHCS and the SH. The SHAD 114 additionally performs communications with the SH utilizing application link 118 for enabling various functionality to be described below, which requires intercommunication between these two devices. It is contemplated that the means for such application level communications (115, 116, 117, 118, or other applications link not explicitly shown) would in many cases utilize Bluetooth or Wi-Fi, or the associated variants together or apart. Other communication technologies are contemplated as well for use in the forgoing links, including cellular, 4G, LTE, 3G, WCDMA, HSPA+, 1×EVDO, CDMA2000, NFC, UWB, acoustics, ultrasonics, infrared, irDA, and the like. Similar physical communications technologies are contemplated for enabling the application link 115 between the SHCS and the SHA as well, including the use of 4G LTE, or 802.11 Wi-Fi via router 105.

In one embodiment, router 105 is a so-called femto cell and provides 4G or other cellular technologies (WCDMA, 1×EVDO, etc.) as a local interface to the SHAD 114, or SH 110, or another device, with an internet connection (via links 130 and 129) to the cloud 102. Cloud 102 in some embodiments is a public internet, while in other embodiments may be a private network such as those operated within a large service provider such as AT&T, Time Warner, Comcast, or the like.

The mobile device, having a smart hub application, is one embodiment of a smart hub application device (SHAD) 114. It is contemplated that various embodiments of a SHAD may operate within the embodiments of FIG. 1. One alternative SHAD is a standalone and purpose built smart remote device, explained in more details associated with embodiments described associated with FIG. 3, FIG. 5, FIGS. 7A and 7B, FIGS. 9A and 9B and elsewhere. In one embodiment, SHAD 114 utilizes Bluetooth LE wireless capability and is capable of detecting Bluetooth beacons (or Wi-Fi) such as those contemplated in related application.

Smart Hub Source Selection and Switching

An embodiment of the smart hub (SH) 110 operates as a smart switch, allowing for a number of services to be discussed, including in some embodiments acting as a universal remote control, together with (or individually) acting as a smart and predictive content source switch (High Definition Multimedia Interface (HDMI) ports for example). In one embodiment the SHAD 114 provides for a user interface to provide for manual control of the SH universal remote control functionality, as well as the HDMI port selection to be output to HDMI input of television monitor 111. The SH may additionally be capable of selecting other source inputs such for output to the monitor 111, such as streaming audio (Pandora® for example), streaming video (Netflix®, Hulu®, Amazon® Prime for example), remote display content (Apple's Airplay®, UPnP, or Google's Chromecast® for example), content from one or more USB ports (mp3, mp4, jpg files), or a local or remote server (iTunes®, iCloud®, Dropbox®, Skydrive®, Google® Drive, Amazon®, a shared NTFS or directory, or the like), or other sources.

Smart Hub Universal remote control feature

In some embodiments, the SH includes a universal remote control functionality and is capable of controlling the power on/off, channel, volume, pause/play, rewind, fast forward, channel switch, picture in picture, DVR recorded content selection, one-demand content selection, track selection, chapter selection, and other traditional remote controllable features of a device providing content to one or more ports of the Smart hub 110. The universal remote control functionality of the SH 110 in some embodiments extends to the control of the other forgoing content sources, such as streaming or local sources. Such control may include performing a series of steps in combination to achieve a desired user selection or autonomously determined source selection and enabling of the source content. For example, a login username and password may be provided to a streaming service, or local network credentials provided to a local computer for gain access to iTunes® content or the like, and commands exchanged with content servers to effect desired actions (pause, fast forward, rewind, program, movie, song selection, etc.). Combinations of so called "soft" universal remote control capabilities applying to the delivery of streaming or other non-local content devices, and/or a number of hard remote control steps (to local devices providing HDMI or other input to a physical port or the SH) may be combined in series to achieve specific goals associated with user desired or associated with determined content switching events. As one example, the SH determines a switch should occur. Such a determination may be performed predictively, or with direct command from SHAD 114, or predictively and with confirmation from the SHAD 114 user input authorizing a suggested switch. Associated with a switching event, the SH, in one embodiment, would power off the previously used device providing input to a HDMI input for example, and power on and send specific other related commands (setting the display to recorded programs listings on the digital video recorder (DVR)/Cable box for example) to a second source device, then perform the switch to the new HDMI port, in a coordinated manner. In one embodiment, the new source may be a streaming source such as Netflix®, and there may be delay in gaining access to the new content, and the switch from and power off of the previous content source may be delayed until the new content is available as a stream, or at an input port of the SH 110 device (in the case of a HDMI interface from a DVR/cable box for example). In some embodiments, specific universal controller commands may also control outputs of the content, such as the monitor 111 (input HDMI port to the monitor 111, volume, audio output source, audio input source, source, picture settings, display settings, and the like), and Audio system 112 settings (volume, input port, processing settings, equalizer settings, output settings, etc).

The configuration of such controllable devices may be set using several methods, for example the SH 110 may perform an search for control protocols and examine the HDMI or other input ports for activity associated with a specifically transmitted remote command so as to automatically determine the specific control protocols and with feedback based upon monitored device inputs to the SH 110 from Sources 1 to n. The discovery and configuration of a Smart Hub Remote Extender (SHURE) 120, or additional SHUREs may be performed in similar approaches and including interaction with a user of SHAD 114 to perform confirmation steps or provide required information to allow for configuration. The detection of a specific SHURE by SH 110 may be performed in an approach similar to the detection of a SH 110 by a SHAD 114 using transmitted beacons for example from one or more of the devices (iBeacons® in one embodiment, and/or beacons as described in the related application(s) referenced above.

Learned Behavior by the Smart Hub 110

The Smart Hub 110 may qualify and respond to "events". Events can be activity after long pauses, learned behavior of a user such as regularly watched programs, etc. After long pauses in activity of the Smart Hub, if a Remote device is detected (event), autonomously switch to the user preferred source. The Smart Hub 110 can look for patterns such as regularly watched shows and autonomously switch to regularly watched programs at the time of day when the program is aired based on user preference and what users/user devices are detected in the room.

Fuzzy switching concept. Beacons. The Smart Hub 110 emits a Bluetooth beacon. When a smart phone or second device configured to communicate with the Smart Hub 110 enters the local area of the Smart Hub 110, the beacon causes an inactive application within the smart phone/2nd device to launch and engage with the Smart Hub 110. The smart phones response to the beacon may influence switching or switching preferences. Providing program specific content such as live commentary about the currently running program, use of twitter or Facebook, or other social site with the second screen app, take polls, push advertisements or offers, or program information. Beacons may also be used by the Smart Hub to learn whose devices are located within the local area and adjust preferred settings based on which users are located in the area. The Smart Hub 110 can be configured to switch sources through manual input via a physical button on the remote, smartphone, or other device. The Smart Hub 110 may be controlled by a text message, twitter message, Bluetooth signal, WiFi, or Ethernet carried message. The Smart Hub may be controlled via the microphone located on either the Smart Hub, Remote, smart phone, or smart device by voice recognition or even use of a "clapper". The Smart Hub received SMS messages from a plurality of addresses that can be prioritized, allowing for protection from override, or to allow for an override of other inputs from other addresses. A name associated with a port (HDMI port for example) and a name associated with the SMS address ("Hubbie" for example). Ex: "SIRI, new message to Hubbie, switch to HDMI 1".

Device Discovery

As described associated with FIG. 7A, the SHAD 114 discovers the presence of SH 110 by detecting the transmission of beacons from the SH 110. (In alternative embodiments, the SHAD 114 may transmit beacons to be detected by SH 110, and/or SHURE 120.) The SHAD 114 detection of beacons (in one embodiment by the operating system of the device of a specific identifier in a Bluetooth transmission called a proximity UUID or universally unique identifier, and other information such as a major and minor value as defined for iBeacons) provides for the invocation of the smart hub application on the SHAD 114, and allows for the performance of a number of actions. Some of the actions involve the determination and display of specific user input information, which may be context dependent. For example one display of the device may be as simple as notifying the user they are now in range of the SH 110, and if they would like to display the smart hub application interface for use. Other interfaces screens may be dependent upon the specific information determined as a result of communication with the SH 110 using link 118, and may include a request for the confirmation of a potentially and suggested desired content switch. One such example would be, the start of a live sporting event or other program, and the suggesting o switching from another HDMI input (XBOX for example) to the cable box output to the input of the SH 110 as to display the live contents on the display 111. Such indication may be simultaneously displayed or exclusively displayed on the monitor 111 as well. Other screens are disclosed in forthcoming descriptions, and include in one embodiment:

Universal remote control interface
switcher control
second screen services
Social Interface
System configuration service
Sound interface
Services interface
Advertising interface
Offers interface
Incentives interface Content Identification The SH application in the SHAD 114 may also be capable in specific embodiments of presenting so called "second screen" information to the user, and the information may be dependent upon the specific content selected by the smart hub 110. The smart hub may determine the identity of the content using audio or video based fingerprinting techniques as known in the art, and using SHCS 103 or the cloud servers accessible by link 116, or by internet cloud 102, via cellular system 101, local network router 130, and WAN interface 104, or other means as described (via interface to SHAD 114 using link 118 for example).

The SHCS 103, in some embodiments, may perform the identification of the selected, or other available source content so as to determine and associated information relating to both currently playing, or available source content (for example on another HDMI input port to the SH 110, or on a DVR, of streaming service screen). Examples of second screen information available to the SHAD 114 application to present to the user include advertisements, offers, loyalty points, social content (live Twitter® hashtag content associated with the specific SH displayed content, or other available content, ratings of the content from Internet Movie Database (IMDB.com) or like sources—which can be used as input to suggesting a switching proposal to user in some embodiments, offers for the purchase of related content—music from the show, apparel form the show, a DVD or movie download or digital rights, an offer to barter for other content as described in the related application(s), incorporated herein by reference).

In one example, games may be played amongst users of defined groups watching the same content (for example all users watching he content, only friends belonging to a friend list, only people in the same room, or location—using a single SH, or set of SHs.) Such games might include polls associated with guessing potential outcomes of the plot of a show or movie, then displaying who got it right, and wrong, or what all the users collectively think will happens, or thought would happen, and comparing the predictions with what actually did occur.

One further example is predicting details of a live sporting event, and showing a graphical representation of the collective group thought, as it currently stands in favor of one team or the other. Other examples include polls associated with one event among a plurality of events—presidential election predictions and/or results for example. The SHCS in some embodiments may further collect statistics associated with viewing behavior of users who are identified as being present in the room of the smart hub 110 while specific content is being played, or if not individually identified, collecting generally content statistics. Such information being usable for targeted advertisements or offers, or other uses where knowledge about who is watching currently, or generally would be usable for more effective communications and offers.

A server may back up the settings from the Smart Hub and is logically connected to the Smart Hub 110 in one embodiment. The server may receive audio or video samples and identify the content being watched. The server may receive "samples" as reconstructable coded information or encoding or hashing the content in a non-reconstructable way so as to allow for identification, but not necessarily recreation. Performing the identification of the shows or audio content my take place locally on the Smart Hub based upon downloaded "signatures" to hashed content information or the identification may be performed on the server. Identifying the content may be based upon information encoded within the content stream itself, such as metadata, or information packets, or digital channel guide information, or interacting with the content providing Smart Hub itself (Ethernet, or HDMI interaction).

Smart Hub Universal Remote Extender (SHURE)

In some embodiments, the local devices are controllable by infrared and known protocols and standards (IrDA for example), but are "blocked" by physical obstruction so as to prevent the remote control signal 127, 131 (as an IR signal in one embodiment) from the SH 110 being able to control a specific device (for example source 2 108 being a cable box including a DVR in one embodiment). In such as case, a physical wire with an IR transceiver or simple emitter may be employed as known in the art. In one embodiment the SH 110 may send Bluetooth commands (a one embodiment of link 124) to a smart hub universal remote control extender (SHURE) 120, which provides IrDA commands (as one embodiment of link 125) to the associated "blocked" device/source 2 in the forgoing example, each step being performed wirelessly, and in some embodiments the SHURE 120 is battery powered.

A block diagram of an embodiment of the SHURE 120 is shown and further described in connection with FIG. 10. Alternatively, in some embodiments, SHURE 120 may receive commands to control the sources 1 to n (107, 108 . . . 109) and/or Audio system 112 directly from SHAD 114.

User Input and Confirmations on SHAD, and Example Uses

The input to the SHAD 114 for the confirmation of a switching event, or to invoke another actions such as invoking a switching event to the next, or a specific input or source may be based upon use of a motion sensor, proximity sensor compass, or accelerometer in the SHAD 114 so as to allow for tapping twice for confirmation, or no input/a different input for denial of a suggested switch. As a result confirmation may be performed without taking the device out of a user's pocket. In one scenario, the SH 110 determines a switch of input source may be desired, and displays a notification on the screen for a period of time, and will only perform the suggested switch of one or more users having SHAD devices tap, shake or move their SHAD 114 as confirmation (in various embodiments). The various SHAD sensors, as mentioned above and typical in smartphones such as the iPhone® 5s may further be usable to enable games to be played individually or as a group. The SH 110, using the universal remote or other capability may translate commands into the appropriate interface for a Wii®, XBOX®, or other gaming content source or platform, further the SH 110 may provide for games to be played directly on the processor of the SH, or remotely on the SHCS 103, or the like. In some embodiments, the SH may display simple games (Packman®, Pong®, etc.) directly over the content on the screen, for example during commercials. Such commercial periods may be determined by user confirmation as a result of suggestions by the SH in one embodiment. In other embodiments, the SH may perform commercial period detection autonomously, and perform a switch to other content with no input from a user, or with confirmation as discussed or in another conformation approach. In one example the commercial is displayed in a picture in picture mode by the SH, and another gaming platform is displayed for the users to play during the commercial (using traditional platform game controllers, or alternatively using the SHAD devices as discussed).

Returning to the main program may again be performed via suggestion by the SH and confirmation on the SHAD, or simply by a specific input on the SHAD 114. One such input might be waving the device side to side, or up and down, or in circles in a specific direction to provide specific inputs, tapping, or number of taps on the device to indicate various desired actions. For example tapping the SHAD on the table twice (or the back of the device twice with your finger) could indicate go back to the previous "main show (and for example, two taps to confirm switching to a secondary source, and/or 4 or 5 taps to invoke switching back). In one embodiment, the secondary content may be paused using the SH 110 internal universal remote or universal remote extender 120, when the main show, or content is being displayed, such pausing occurring automatically when the SH 110 returns to the "primary" or main show being watched. Such motion or touch based inputs and gestures may act as a general approach for navigating menus displayed on the monitor 111 by the SH 110, again with the advantage of not having to remove the device from a user's pocket to provide input (in the form of tapping in a known pattern for menu down, up, select, back, for example).

User Identification, Presence and Location, and Acoustic Equalization

The presence and identification of a specific user (presumably associated with a specific SHAD, such as 114) may be performed by Bluetooth LE "ranging" as available in IOS® 7, or other variants. A more accurate approach may be achieved using the SHAD microphone to time the acoustic transmission from one or more speakers 113-1 to 113-4 individually or in combination.

Figure 9A:
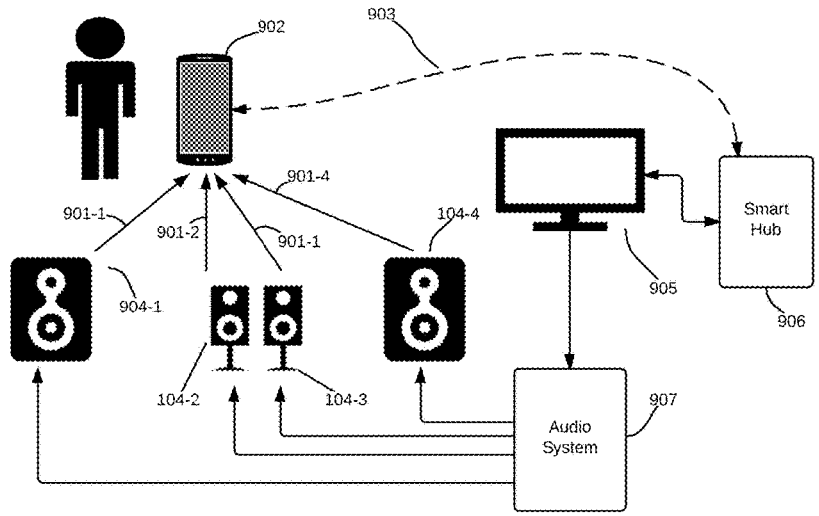
FIG. 9A is an example illustration of utilizing combined Acoustic and RF Processing to determine information related to the a SHAD device.
Figure 9B:
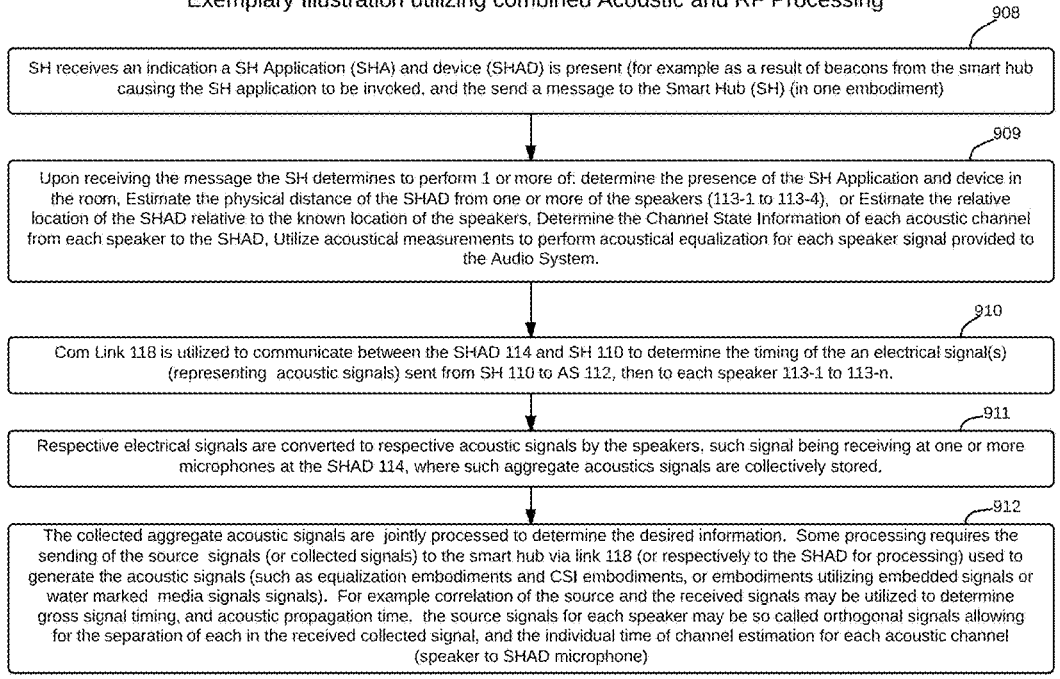
FIG. 9B is an example system flow diagram a smart hub system process embodiment utilizing combined Acoustic and RF Processing for the determination of Acoustic channel state information (CSI) (including one or more of: presence in a specific area presence, location (proximal or absolute), acoustic channel equalization, spatial equalization, and the like).

Such a process is further described associated with FIGS. 9A and 9B. Range may be determined form each of the speakers by performing a timing reference point between the SH 110, and the SHAD 114 using wireless transmission(s) between them. As the wireless transmissions will propagate significantly faster than any acoustic transmissions form speakers 113-1 to 113-4, the vast majority of the delay will be a result of the acoustic propagation from the speakers to the SHAD 114, to be detected by the microphone inputs of the device (other than any processing delays in the overall process which may be calibrated out). As a result the physical distance of the SHAD 114 from each of the speaker may be accurately estimated, and the user (associated SHAD) distances from each speaker determined, given the know speed of sound, and accurate delay calibration of the system. If the geometry of the speaker arrangement is known, the actual location of the user may be determined is a sufficient number of speakers are utilized (3 speakers for actual location, and 2 speakers for two locations with an ambiguity of which location—which a ambiguity being resolvable with knowledge of the room potentially, or in combination with Bluetooth ranging approaches.) If the geometry of the speaker arrangement is not known, the presence of the user (SHAD 114) in the room, versus the speaker not being in the room may be surmised based on distance, and the knowledge that sound does not propagate through walls of the structure, as the Bluetooth beacons will). The Bluetooth ranging in combination with acoustic ranging is usable to provide an estimation of user/SHAD location as well, given the knowledge of the speaker geometry with the SH location. In an alternative embodiment, one or more USE 120 devices may be placed in known locations within the room, and used to perform multiple ranging processes between the SHAD 114, the SHURE 120, and the SH 110. Potentially additional techniques may be used to refine the possible location of SHAD 114.

One approach to the calibration of the acoustic ranging approach is to include a microphone within SH 110 or one or more SHURE 120 devices, capable of receiving the acoustic transmissions from the audio system 112 and associated speaker 113-1 to 113-4 (or any number of speakers in embodiments). When the SHURE 120 includes a microphone, the time delay from the transmission (or reception) or a BT or other wireless transmission to the reception of the acoustic signal may be determined. In one embodiment, the SHURE 120 having a mic is placed at the speaker location to determine an absolute timing reference of the delay to transmit the acoustic ranging signal. When the mic is in the SH 110, the propagation from the speakers to the SH and the ambiguity are summed, known geometries may be used to calculate the actual calibration delay. In general specific embodiments, no calibration would be required and the processing delay and wireless communications delay would be negligible in comparison to the acoustic propagation delay. The acoustic signal may be useable to so-called "channel measurement" or channel sounding to determine the signal processing "channel propagation state" or channel state information (CSI) between each speaker and the relevant SHAD 114 microphone (217 of FIG. 2). Such CSI may be frequency dependent and useable to perform acoustic equalization of the room so as to optimize the audio experience for the user of SHAD 114. The acoustic signal may be sent standalone in with no other sound present or it may be embedded in existing source media and performed real time and periodically or continuously. Such a process ideally uses an acoustic signal which is not detectable by a user listening to the content selected by SH 110. One approach to such a signal would be to embed a lower level signal within the media acoustic signal in such as was as to minimize it detectability by a person listening, and the signal having a wide bandwidth allowing for channel estimation. One such signal is an Orthogonal Frequency Division Multplex (OFDM) pilot as used in IEEE 802.11 wireless systems for channel estimation, or a Zadoff-Chu or other CAZAC code as used in LTE, or even Walsh codes as used in CDMA cellular systems, or barker codes or CCK codes as used in IEEE 802.11. Such signals may be correlated with the know reference versions of the signal to determine the channel impulse or channel frequency response of the acoustic channel. A number of the lower level reference signals may be integrated (or the results of multiple correlations would be integrated) to provide to processing gain and detectability, resulting in a signal to noise ration allowing for quality channel estimation and presence determination. Another approach, in an alternative embodiment, is to capture the actual received audio at the SHAD 114, and correlate it with a stored copy of the actual media audio provided to the audio system 112 by the SH 110 (directly or indirectly via monitor 111). Correlating these representations or the acoustic signals will allow for the delay estimation from the SH 110 to the SHAD 114, and in some embodiments from each of the individual speakers 113-1 to 113-4 based upon a known specific "orthogonalization" of the signals. For example, the left and right audio will generally have significant differences and may be orthogonalized per known signal processing techniques. The tweeter and woofer audio will also have differing responses, including amplifier cross over effects. For known speaker sources such as Dolby® 5.1, specific signals are send-able to each speaker and control of these sources is possible.

Modification of the source signals by phase modulation to aid in the acoustic sounding signal orthogonalization is also contemplated. For example, the phase modulation of acoustic signals is generally difficult to detect for the human ear. As a result, an embedded sounding signal derived from the delivered media, using an orthogonal code on it will allow for orthogonalization of the simultaneously transmitted sounding signals. When one speaker is sounded at a time, no such orthogonalization between speaker outputs is required, though it may remain beneficial for specific reasons. In one embodiment, the embedded sounding signals, may be orthogonalized to the main media signal, allowing for superior detection.

Figure 2:
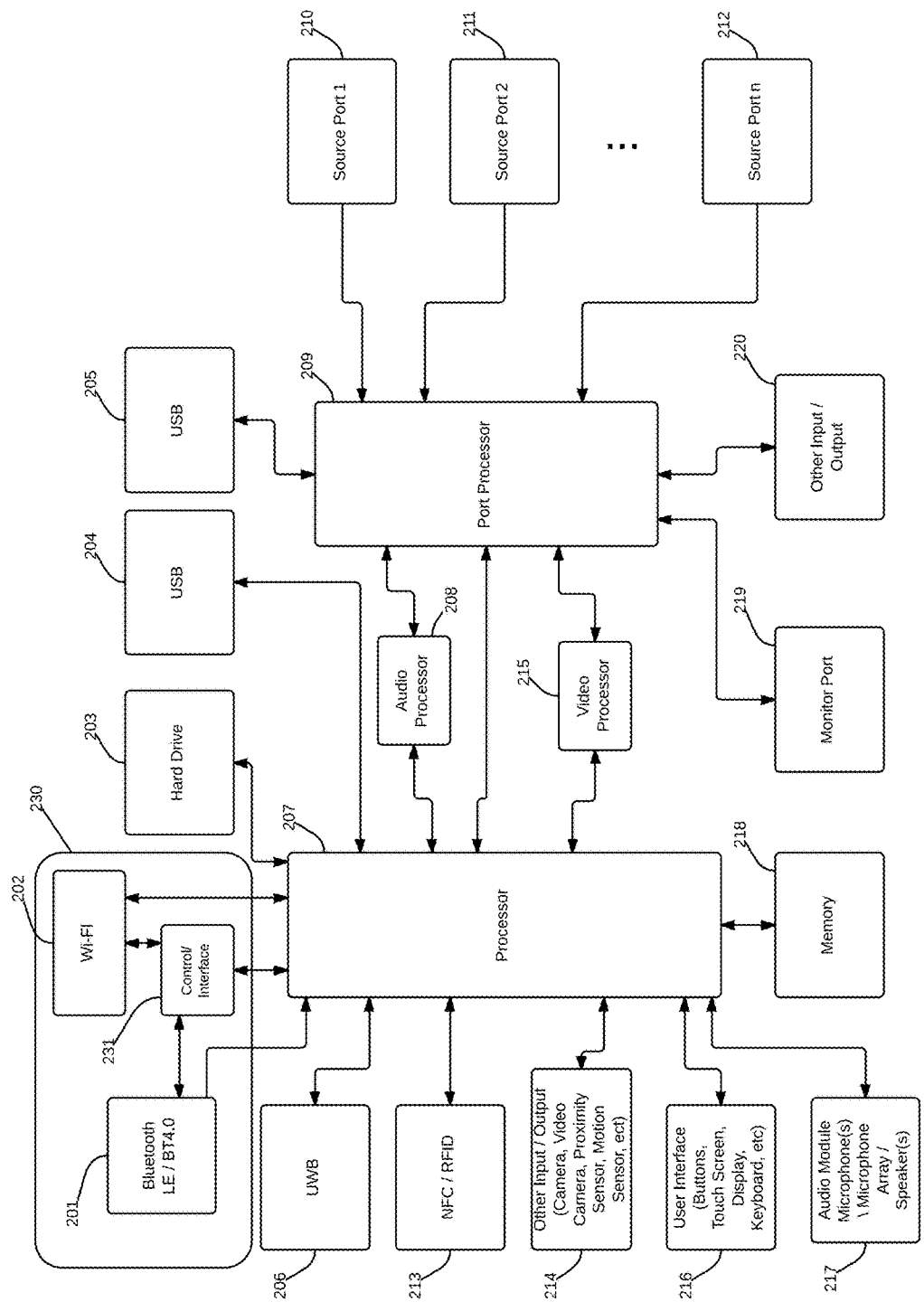
FIG. 2 is a block diagram depicting an example architecture of a smart hub (SH) embodiment.

FIG. 2 is a block diagram depicting an example architecture of a smart hub (SH) embodiment.

Referring now to FIG. 2, the Smart Hub 110 is equipped with a microphone 217 and is configured to delay the primary video and audio to ensure synchronized audio at the remote speakers 113. The microphone 217 is configured to "hear" the delay differences from the speakers and delay-adjust the speakers. The Smart Hub 110 can perform room equalization based upon deterred audio from integrated microphone 217, microphone array, or microphone in remote speakers 113, or in smart phone applications.

To effect HDMI port selection to output HDMI port, in one embodiment, a port processor 209 is utilized which may be a suitable HDMI switch, or a more sophisticated port processor allowing for audio and video processing and the decoding of the content and re-encoding of the modifier content, such as utilizing silicon image port processor SiI9535, or SiI9533 by Silicon Image (www.Siliconimage.com), and may incorporate audio processor 208 and video processor 215 within the component. In one embodiment, the processor 207 is an Arm cortex based processor running Linux® such as the ST SPEAr310 or other appropriate processor such as those from Texas Instruments (TI)®. In one embodiment the Bluetooth module 201 including a TI CC2554 BTLE chip including an 8051 programmable microcontroller, or the like. In one embodiment the Wi-Fi is provided by Qualcomm® or Broadcom®, and may incorporate an arm processor performing the functionality of processor 207, as well as Bluetooth module 201, and other functional blocks such as memory 218. Not shown in FIG. 2 is nonvolatile flash memory, which may be incorporated within memory 218 in specific embodiments.

Port processor 209 provides the content form ports 1 to port n as selected to one or more output ports including output port 220 in the illustrated embodiment. Ports 219 and 220 may be capable of input for "return path" information in some embodiments (reverse audio for example). Such parts as described may be capable of Mobile High Definition (MHL®) input or output in specific embodiments. Port processor and audio and video processor 208 and 215 are capable of audio equalization of the source ports to the output port(s) 220, 219 in some embodiments. In some embodiments, Wi-Fi interface 202 may receive streaming content which may be provided to the port processor directly or via processor 207. In some embodiments, one or more Universal Serial Bus (USB®) interfaces 204 and 205 may receive streaming or stored content which may be provided to the port processor directly or via processor 207. NFC interface 213 may be used for the pairing a SHAD 114 with a SH 110, utilizing processor 207 for control of the process.

Video Analysis to Determine Activity on a Source Port or Stream.

The Smart Hub 110 may perform video analysis on a plurality of sources 107-109 to autonomously switch between the sources, in one embodiment. By using video analysis to compare individual frames, the Smart Hub determines information concerning sources of content. The Smart Hub 110 is capable of using static processing to compare images at different times to determine content. The Smart Hub 110 will compare two images, determine if the image is changing (pattern matching over time), and autonomously switch to the most preferred source determined by the probability processor, or a logical process such as those described here in and associated with FIG. 8. If change of content is detected, the Smart Hub may change sources to the active source, according to specific rules and processes (for example see FIG. 8). If the source has been stagnant for a long period of time before someone is the room and a person walks into the room, the Smart Hub would switch a newly active port in one embodiment, as any newly active source being correlated with a newly arrived user, and a long period of inactivity would indicate a high probability of the newly present user having made the source active, and desiring to view that active content. Some embodiments of such logical flows are further described in connection with FIG. 8.

Audio Processing to Detect Active Content on a Source Port

The Smart Hub 110 may perform audio processing to determine if sound has changed over time, or if the audio of a specific port is not present, or very low level, or otherwise have change statistical level (general volume or dynamic range for example). The Smart Hub may listen for changes is electrical sound waves from the plurality of sources and autonomously switch between sources when a one source changes from an inactive state to an active state. Such processing may also be utilized for the detection of commercial associated with times of increased volume, or other properties of the audio, such as a sample histogram or dynamic range which may be unique to a specific content provider indicated an alternates media (show vs commercial). The reasons to change selected source may be different under differing conditions. The Smart Hub may detect user input from one of the multitude of active sources and autonomously switch to that source. Smart hub may also use Smart combinations of events with monitoring content and correlating them to determine what to do. For example, if someone has been present for a long period of time and a source has been playing for a long period of time, it may be a poor time to switch sources when a new user enters the room. Smart hub 110 may use metadata to determine when to switch, such as movie length metadata or commercials. Smart Hub 110 may also activate picture in picture during commercials.

Figure 3:
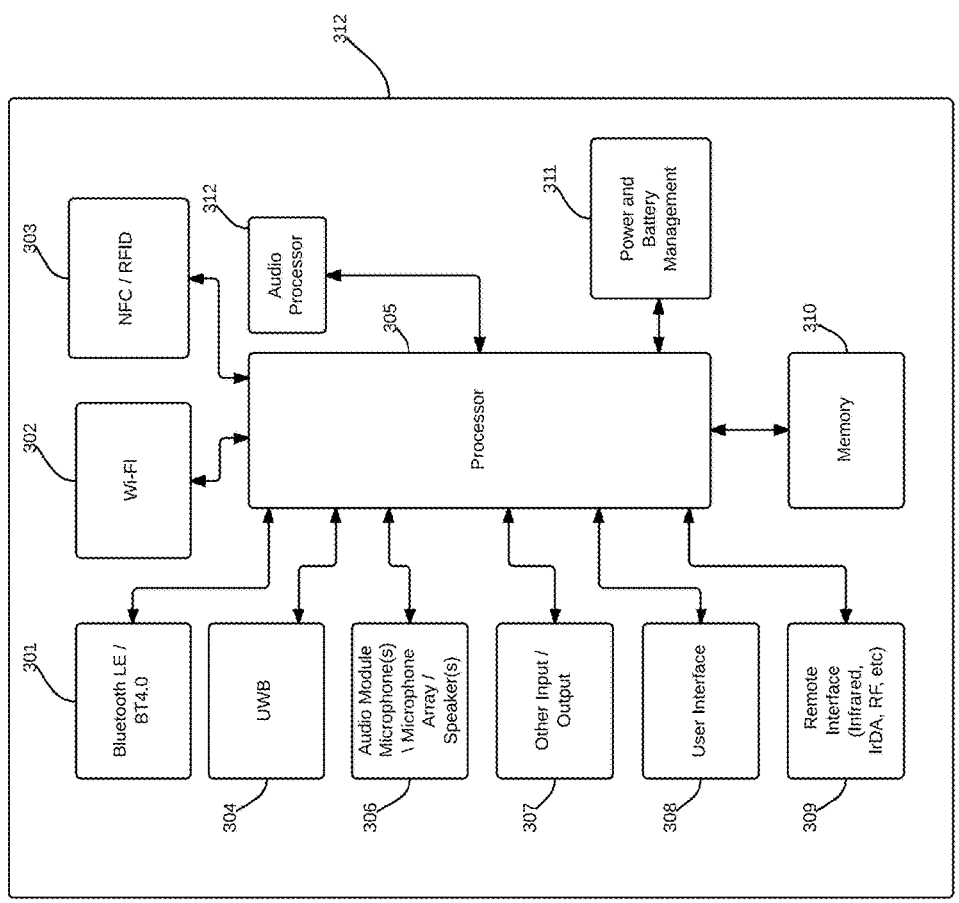
FIG. 3 is a block diagram depicting an example architecture of an embodiment of a smart hub remote control (on a smart hub application device, referred to as the SHAD embodiment).

FIG. 3 is a block diagram depicting an example architecture of an embodiment of a smart hub remote control (on a smart hub application device SHAD embodiment).

Referring now to FIG. 3, in one embodiment, a remote 312 can be used to control the Smart Hub. The remote 312 can be integrated with WiFi, Bluetooth, etc., to communicate with the Smart Hub 110. The Remote 312 has the capability to perform "local equalization", in one embodiment, of the speakers within the room as discussed. Local equalization equalizes the volume of a plurality of speakers around the remote to create an optimally pleasant experience for a user sitting next to the remote (or the SHAD 114). Further, the Remote can be used to equalize the audio of a plurality of speakers located within the room to create optimal acoustic characteristics within the room (real time room equalization and can be inaudible to the listener). The Remote 312 may be any wireless remote device including a smart phone or tablet. The remote may be a smart phone using an "app" configured to control the Smart Hub 110 and may be used control the Smart Hub 110, act as an speaker for personal listening, or display second screen content. The Remote App of a SHAD 114 can capture voice commands to switch between sources, or perform other functions. The voice recognition could be performed in the Smart Hub, Smart Phone, or cloud. Third party applications, such as SIRI®, may perform the voice recognition. Smart Hub 110 can provide metadata for statistical data about what content is watched and by whom. The App may display secondary information relating to the content that is being displayed from the active source, such as advertisements for products and the like.

The SH 110 in one embodiment is capable of performing the "switching" over the same physical interface, but between different content sources. For example, it may switch over Ethernet/WiFi from two different streaming sources. Such sources could be Netflix, Hulu, Amazon Prime video, a DVR with a digital interface, etc.

The server SHCS 103 may learn and update settings on the Smart Hub based on information from the Smart Hub or from a user's device, or a web portal associated with the service, and/or by sending switch signals to a content providing device over the HDMI upstream link and/or by requesting and receiving channel guide information from the user's device.

The server SHCS 103 may interact with a consumer device based upon collected information from the Smart Hub (SH) 110. The server 103 may perform pushing of information directly, or indirectly, for example via the Smart Hub. The server 103 may configure the Smart Hub 110. The server may learn and update settings on the Smart Hub based on information from the Smart Hub 110 or from a user's device, or a web portal associated with the service. The server may determine when specific ports have been switched. The server, in one embodiment, may provide for payment/authorization and enablement of new services on the device (any other the service in the below may be non-conditional services as well). Authorization services may be provided for WiFi credential sharing to new devices wanting to come onto the network.

Additional services provided by either the SH 110 and/or the SHCS 103 may include content filtering and not allowing for switching to that content (parental rules/controls), audio processing (audio "room equalization"), providing display services, picture in picture (PIP), "commercial identification", and switching back when the commercial is over. The SH 110 may enable secondary show or "standby" show watching during commercials or may invoke a DVR input during an identified period (such as before a show starts, or during a commercial). The SH 110 may switch to the DVR input, and control the DVR to play during the duration of the commercial. It may also be arranged for: Keeping a PIP of the primary show on the screen to allow for manual switch back; keeping a primary DVR of short period of time, to allow for correction of mistakes in switchback to primary; or catching up to real time during next commercial period. For example: SH 110 may be playing the Nintendo Wii during the commercial period or may be switching to social media or other related content—similar to the mobile device "second screen" display for the commercial period times. This is thus providing for a display "overlay" at the control of the Smart Hub, and added to the selected input (for commercial switch for example) or social interaction display such as Twitter trending or for directions to associate a device or for configuration.

Based upon any event or condition, Smart Hub may also start or stop the transmission of iBeacons (or other beacons) at the Smart Hub. For example, if the Smart Hub does not have a clear switch decision, it can invoke the Smart Hub control application on the user's device, but not invoke it when it is not required. Multiple invokable screens on the user's device are also possible including: Switcher control, second screen services, configuration service, cloud interface, service interface, advertising interface, offers interface, and/or incentives interface. In one example embodiment, the server can manage a loyalty program for an account associated with the Smart Hub and or one or more mobile devices or an individual or group of individuals.

The smart hub 110 may mute or switch over to another source for the duration of commercials and other events. It may add other audio source switchover as a secondary audio input during commercial, such as music from other inputs, for example streaming from the internet, form other HDMI inputs, Airplay, uPnP, other wireless sources (BT, WiFi), other inputs, optical, RCA®, audio jack, et. The Server may stream audio from Pandora®, Spotify®, etc. The SH 110 would then perform video or audio analysis based upon past statistics such as audio levels to determine the commercial time periods (or other time periods of interest) and based upon input designating a commercial or a show period, analyzing collected information to refine the commercial or "secondary" period of time. The SH 110 will switch back to the primary source once it has determined that the commercial is over. For example: storing a running average audio level, and upon input "this is a commercial", SH 110 can determine the interval over which the period is consistent based upon the audio or other ongoing information (images, blackouts, etc.), the SH can then categorize statistics related to the time periods and for time periods not designated as commercial (or designated as not commercial) and set up, or refine the rest of the audio periods.

Audio Leveling and Filtering Feature

The SH 110 may provide, in one embodiment, audio "leveling" (i.e. no excessive loud or soft sounds) using an audio Automatic Gain Control (AGC) approach, and/or aid in the approach for users with some hearing loss, and amplify the audio, but dynamically adjust it, so as to prevent excessive volume deviations. In one example, the SH 10 may a spouse from being woken up, filtering excessively loud explosions, etc.). In other examples, the SH 100 may identify specific types of sounds such as those not suitable for children—curse words/profanity/explicit, and lower volume during those short periods, or the server may blank video during inappropriate scenes having been detected, or switch to another source, or modify the image so as to "cover" inappropriate images (automatic censoring).

Content Filtering and Smart Hub Bypass Prevention

The SH 110 may physically lock the device to the HDMI input in one embodiment, detect the rating or other aspect of the content and prevent it from being displayed. The SH 110 may display a message, or switch to other content, or blank screen and display a message, potentially with picture in picture. Alternatively the SH 110 may sense when the HDMI or other port has been disconnected from the display 111, and alert the designated parent that content may be played which is not authorized through the SH 110. Such an alert may be provided via email, SMS, Twitter, or phone call, of other communications approach such as Bluetooth. In one embodiment the Smart Hub 110 includes a microphone, which listens to the output of monitor 111, to verify that the content on the monitor is the content that is being displayed, and provides alerts such is not the case such as when other content is displayed or played on the monitor other than the selected content form the SH 110. Further, a wireless or wired camera may interfaced with the SH to perform visual verification that the content displayed on the monitor 111 is the content selected by the SH 110. In one embodiment, server SHCS 103 provides messaging alerts when the smart hub 110 is not responsive due to power being off, or other conditions, or alerts generated by the smart hub itself.

WiFi or Local Network Access Facilitator

The smart hub 110 may act as a WiFi "security" guardian using Bluetooth to connect a device, or to a WiFi Access Point (AP) signal. The "security" guardian feature allows a device to request connection to the WiFi network, using the app on the device to configure WiFi for the visiting device (enterprise or regular security) with guest access to local resources, or other levels of access. In this instance, the device passes credentials to the visiting device via Bluetooth or via WiFi direct, or by means of beacons.

Time/Event Based Triggering of Universal Remote Combinations

In one embodiment, the smart hub 110 alone or in combination with server SHCS 103 are capable or performing time/event based triggering of universal remote combinations and sequences of controlling other devices. For instance alarm clock application turning the television on at a certain time, and switching to a specific program to wake a user up, or alert bed time turning all the electronics off, following a warning message displayed on the monitor 111.

Streaming of Audio, and Video Content from Smart Hub to SHAD 114

In one embodiment, the SH 110 is capable of providing selected input sources (both streamed sources, or selected HDMI input sources, or other sources) over the Bluetooth or WiFi network for display on SHAD 114. In one embodiment, such content may be delivered to the SHAD 114 utilizing cellular communications via a mobile network tower and base station 101. In at least one embodiment the content displayed on monitor 111, and streamed to SHAD 114 are the same and synchronized in time by comparing the audio recorded at SHAD 114 from the audio system 112, and adapting delays in the SH 110 so that video and audio between monitor 111 and SHAD 114 are aligned in time to an acceptable tolerance. Such a delay adjustment is generally required prior to the output of the HDMI (or other) signal to the monitor, but after the selection of the content stream for transmission to the SHAD utilizing application link 118, as the streaming process generally incus more latency than the display process to the monitor 111. In other embodiments, or configurations, the selection of content to stream to 114 over link 118 from the SH 110, may be different form the content displayed to monitor 111, and come from differing selected content sources and stream input sources, or other sources. For example a user of SHAD 114 may watch a show from source 1, where the monitor 11 and audio system 112 display and play content from source 2, or from another source such as apple TV, or a DVR. One approach for transmitting the audiovisual content to the device is to utilize the MHL standard for a wired connection, as defined and associated with the HDMI specification.

Probability Processor

Associated with the SH 110 is a processor that permits selection of sources for fuzzy decisions as to making a content source switch. For example, if low probability of a switch exists, it can ask for confirmation, if higher probability, it may make a switch with no further input. For example, if one is watching content currently, and only one device is turned on, the system can display that content on the display with no further input.

This can also use even additive values relative to a threshold to determine a likelihood of a specific content source and then confirm with the user the most likely source to switch to. For example, a user may be identified as always watching cable, and never playing Wii. Weightings would be adjusted for that user and calculated on a per source basis. If the 'top" probability exceeds a threshold, and is above the other probabilities by a defined amount, the switch is made with no further input. If too many sources have similar additive values, the system may ask the user to select from two or three most probable sources. In additional embodiment, a determination of a switch "event" should be evaluated via weightings as well, with various factors adding or subtracting differing amounts and compared to a threshold (one or more thresholds) and or ratios of other factors or values.

Figure 4:
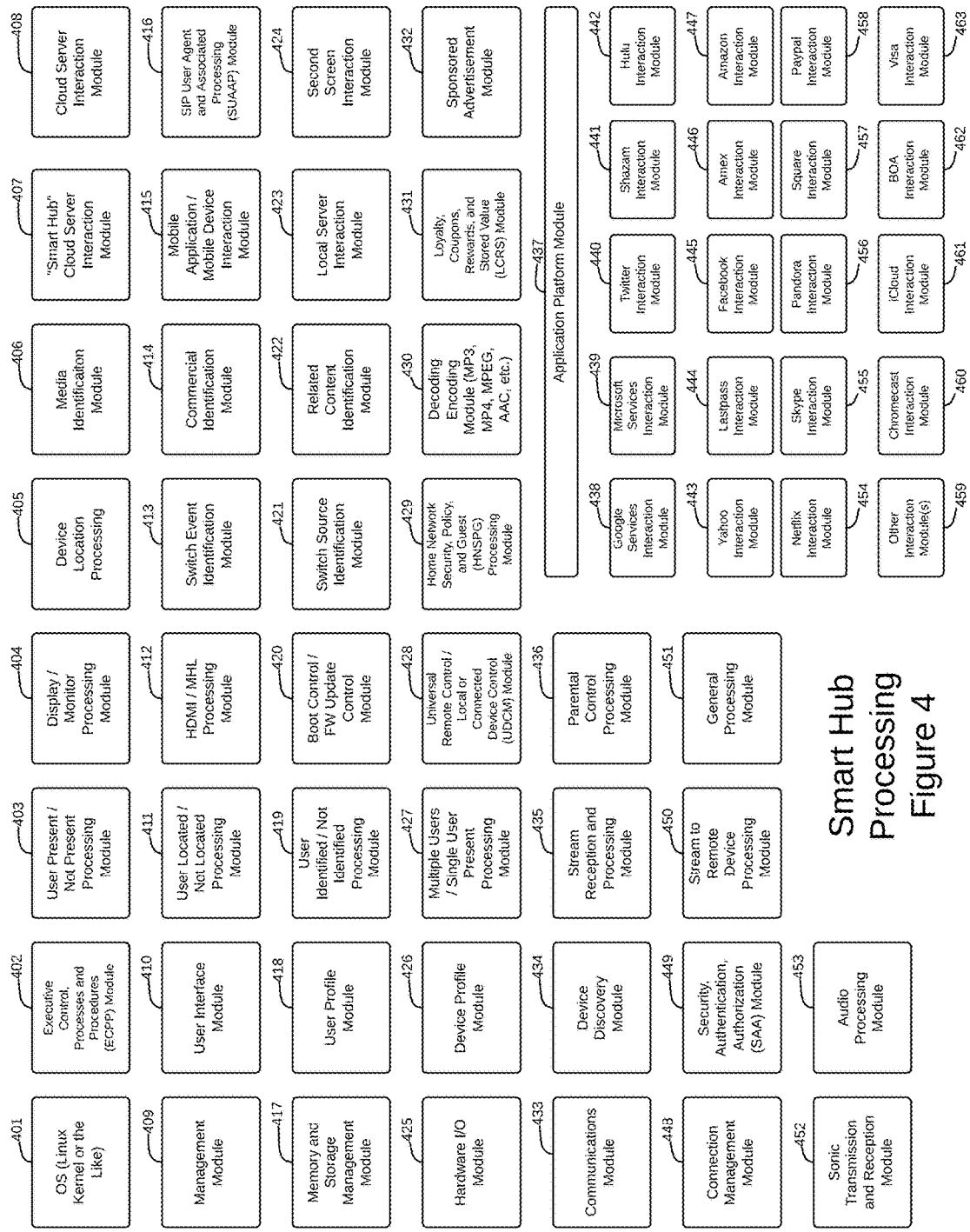
FIG. 4 is an example software/firmware architecture functional partitioning diagram of the processing performed in an embodiment of a smart hub.

FIG. 4 is an example software/firmware architecture functional partitioning diagram of the processing performed in an embodiment of a smart hub.

Referring now to FIG. 4, an example software and/or firmware architecture of an embodiment of a smart hub 110 is depicted. In the present diagram no interconnections between the modules are shown, however interconnections between any and all of the depicted functional modules is contemplated. In specific embodiments, a subset of interconnections may be present to effect specific functional processing and data flows. Some specific modules related to hardware or software drivers or other interfaces or required functional support modules may not be shown but are contemplated and omitted for the sake of clarity, since such modules are commonly known in the industry to one skilled in the art. It is further contemplated that embodiments of one or more of the depicted or implied modules may be combined together to form other functional modules, or described or implied modules may be partitioned into modules of more granularity, or both. Regardless, the specific functional partitioning of the depicted embodiment is not intended to be limiting, rather to be illustrative and other equivalent partitioning are in the scope of embodiments, having the same, more, or fewer functional modules and including all or a portion of the described functional modules in specific embodiments. The responsibilities and embodied functions of the specific depicted modules are well understood to one skilled in the art, based upon the names of the modules themselves, in view of the examples descriptions of specific embodiments elsewhere in this disclosure. Therefore, only specific modules will be described as useful in the description of specific embodiments. For example, the parental control processing module 436 provides the management and enforcement of parent control policy, preventing content from being displayed or otherwise played which a parent has configured as being unsuitable for their child's consumption, or exposure. Such enforcement may include the prevention of the playing of music, video, or images or may provide for censorship (skipping over portions, blurring portions, blanking out portions, blanking, or "beeping" over portions of audio or video as appropriate).

Module 401 depicts an operating system providing an operating environment for other functional modules, such as the well known Linux kernel or the like. Module 402 depicts an executive control, process and procedures (ECPP) module which provides for the "top level" executable program, managing other processes and functional modules. The ECEPP, in one embodiment, is responsible for "stringing" together and drawing on the interfaces, resources, functional capabilities, state management (storage of conditional states for example), and the procedural flows described by a plurality of other functional modules so as to achieve the top level desired behavior of the smart hub (or other embodiment) desired capabilities and functionality.

403 depicts a user present/not present processing module which performs the decision making process associated with when a user is present in the room as detected by processing described elsewhere, or the decision and state of when no users are present in the room.

404 depicts a display/monitor processing module, which provides the configuration and control associated with the port processor so as to effect the display utilizing monitor port 219 to monitor 111. For example, the invocation of picture in picture (PIP), displayed content generated or formatted locally, configuration and management of settings related to (directly or indirectly the video processor 215, and in some cases audio processor 208.

405 depicts a device location processing module, which provides the processing required to identify the location of a device, associated with a user in one embodiment, as being present in the room, or not within the room, or to determine a relative distance from the SH 110, monitor 111, or speakers 113-1 to 113-4, and to utilize this information for the location, proximity, or presence on the room, or a region of the room determination. For example, the determination that a user's device is located in the region in the viewable area of monitor 111 may be utilized for consideration in other modules and processes. In another example, successive location determinations indicate the user (the SHAD device) is consistently moving about the room, may indication that user is not watching the video content and under some conditions may result in ignoring their presence in the switch recommendations, or alternate suggestions of content of more interest, or a suggestion to switch to an audio only program, or in one embodiment, a pause of the content when the users has left the room (in association of the Multiple users/single user present processing module 427) in on embodiment. In some embodiments this module (405) may also perform or be associated with performing the room audio equalization processing which may be jointly performed to determine the range of the SHAD form each speaker so as to determine, or otherwise estimate location. Such processing may be performed in cooperation or coordination with the audio processing module 453, and the Sonic Transmission and reception module 452, and the connection management module 448, and communication module 433, among others.

406 is a media identification module, in one embodiment, which interacts with a server to provide a sample of audio of one or more sources to an audio finger printing service reachable via the internet cloud 102, and receive meta data associated with the identity of the provide audio. Such audio may be extracted form a movie or other video program source, or a game, or the like. The identified content identity in some embodiments may be passed to the calling module or function (for instance the ECPP 403), which in one embodiment may also call the so-called "related content identification module" 422, directly or indirectly.

407 depicts a "smart hub" cloud server interaction module which provides for the protocols credentials and processes used for interacting the SHCS server providing specific APIs and capabilities in one embodiment.

408 depicts a cloud server interaction module which provides for interaction with generic could services or servers and the protocols and processes associated with these interactions.

409 depicts a management module which is useable in some embodiments for configuration and control of the device.

410 depicts a user interface module which provides for user specific generations of displaying useful for requesting and displaying information to a user, on the monitor 111, via buttons or other input/output (I/O) on the SH 110, or on a SHAD 114.

411 depicts a user located/not located processing module which performs procedures based upon if a user has been location or has not been location and follows differing processes depending upon such location. This module may additionally invoke the location processing to attempt to location a user device.

412 depicts a HDMI/MHL processing module.

413 depicts a switch event identification module which determines when a switch event is likely desired, and depending upon implementation may attempt to identify the specific source to switch to, though this may be performed elsewhere in other embodiments, such as in the switch source identification module 421 in one embodiment. Such an embodiment is similar to that depicted in flow diagram of FIG. 8.

414 depicts a commercial identification module which provides for the determination of periods of time which are likely to be commercials based upon the above discussed approaches, as well as others such as determining that commercials are likely to be presented as they have not been detected for a period of time, or that the identification of a commercials is not likely to be detected as the currently viewed content recently was identified as returning form commercial within a period of time making another commercial less likely. Such "likelihood" estimations may be utilized to adjust the requirements for detecting commercials or the period over which (how quickly) a commercial may be identified.

Gesture Input and Menu Navigation and Inputs—Invocation of SHAD Application Via Beacons—Module 414.

This module 414 (or another module, such as 415 application interaction module, 448 connection management module, communication module 433, or device discovery module 434) may also be responsible in some embodiments, for requesting confirmation from one or more users on their SHAD devices, or via a notification on monitor 111, for a suggestion action (such as that a commercial may be likely and requesting input to switch to secondary content in this example). Such input may come from user input on a SHAD device (tapping, shaking, "nodding" the device yes, shaking or twisting the device "no", or the like utilizing the sensors on the device, a input on the device screen, a audio input on the device mic, or the SH mic, or the like using "clap" detection, voice recognition, or the like). Such described inputs and gestures may be considered as usable for input associated with any confirmation associated with any step whether explicit conformation is mentioned as being performed or not in other sections of this disclosure, and may be performed in other modules and processes and stages as well. Further such gestures and inputs may be usable in general screen menu navigation as well. Such gesture confirmations may be enabled by the SHAD and/or hub 110 generating additional or modified beacon UUIDs or major and or minor values within beacons so as to cause a device to invoke the SHAD application into at least the background state so as to measure the gestures and inputs, and send messages back to the SH 110 confirming or not confirmation an action or menus navigation process.

415 depicts a mobile application/mobile device interaction module interfaces to other devices allowing for control and second screen content. Some embodiments may utilize this module for interacting with SHURE devices (such as 120) as well.

416 depicts an SIP user agent and associated processing (SUAAP) module usable for IP video sources, VoIP conversations, IMS serveries (3GGP.org), VoIP services, presence services, chat and IM services, video conferencing services, and the like.

417 depicts a memory and storage management module for Flash and Random Access Memory (RAM) 218 interaction, and other storage media such as a USB flash drive utilizing USB port 204 or 205, a hard drive (such as 203).

418 depicts a user profile module which stores details and SH 110 behavior preferences, and user behavior trends for each identifier user, and relating to a specific user past behavior, selections, preferences, which may be used to provide content on the second screen SHAD 114, the monitor 111, content switching preferences in SH 110, advertisements, offers, personally private content, content viewing permissions, parental control authority over other user profiles, parental control permissions, SHAD 114 association of a device profile with the specific user, content preferences, content source preferences etc.

419 depicts a user identified/not identified processing module which in one embodiment provides for the local decision process associated with SH 110 content switching prediction when users are or are not identified, relating to their preferences, priorities, and profiles from module user profile module 418.

420 depicts a boot control/firmware update control module

421 depicts a switch source identification module which in one embodiment utilizes an interface associated with a switch input such as utilizing HDMI 1.4 HDMI Ethernet Channel (HEC) to enable IP-based applications and interfaces, or other interfaces such as with Thunderbolt®, USB, or the like. Such interfaces identify information relating to the content being provided by the source, other available content form the source, a channel guide from a cable box for example, other DVR recoded shows, or the equipment providing such content utilizing the source interface. This module may work with the media identification module 406 in some embodiments, and with the SHCS cloud server 103 either directly or indirectly to aid in the determination of the identity of the source equipment and interfacing capabilities (for example, utilizing the HDMI or MHL protocol specifications and derived information). Information determined utilizing the HDMI Ethernet Channel (HEC) interface on one or more HDMI 1.4 ports may be stored in the appropriate device profile in the device profile module 426. In some embodiments this module 421 may alternatively or in addition identify the source to which a switch of content should occur in association with the switch event identification module 413. Such an embodiment is similar to that depicted in flow diagram of FIG. 8.

422 depicts a related content identification module which operates alone, or with other modules, and in some embodiments interfacing with the SHCS cloud server, 103 either directly or indirectly (via Cloud server interaction module 408, or SHCS interaction module 407, for example in specific embodiments) and one or more of the application platform module 437 and managed platform services 438-

463, to determine and acquire content relevant to an identified content. For example, it may be determine tweets relating to a specific hash tag related to a currently viewed/displayed show on monitor 111. This module in some embodiments may be involved in the determination of specific advertisements from sponsored advertisement module 432, offers or rewards related to the displayed content from the LCRS Module 431, and the like. The content identified may be utilized and provided to the second screen interaction module 424 for further processing and potentially display on the SHAD 114, or another SHAD. The content may additionally be used by other modules for display as an overlay on the main monitor 111, or as a picture in picture with the content, for example, displayed in the secondary video box. The related content may further be utilized during periods of identified commercials to provide content relating to the currently viewed program, and avoid directly viewing the commercials. Such content may be displayed as the only displayed content during commercial periods, primary content, with the commercial in the secondary PIP (picture in picture) window, or the like.

423 depicts a local server interaction module for, in one embodiment, retrieving and playing content forma local networked drive or folder, or interfacing with a local shared library from iTunes, or interacting with a local media server.

424 depicts a second screen interaction module which determines the coordination of content currently, or recently being viewed on the monitor 111, and provides for screen display formatting considerations, and presentation of content in associated with the Mobile Application/Mobile device Interaction Module 415.

425 depicts a hardware I/O module providing abstraction for the hardware from the other modules.

426 depicts a device profile module which provides for information which is known about the smart hub 110 itself with regard to configuration and settings, as well as other devices, for example, the details associated with the SHCS 103, one or more SHAD 114 devices, and associated application information, audio system 112, "other controllable device" 140, Source 1 (140) through Source n (109), and SHURE devices (120). Such known information, in embodiments, may include the type of device, manufacturer for the device, model of the device, SN, capabilities, communications capabilities and protocols (BT variant (BTLE for example), WiFi variant, beacon capability and (UUID etc.), IR, IrDA, UDP/TCP/IP, MAC Address, SNMP, RTP, SIP, and the like), command sets, menu tree information, known stored content on the device, controllability and process of control of the device, encryption keys, passwords, usernames, credentials, etc.

427 depicts a multiple users/single users present processing module providing for decision flow, in one embodiment, when for example determining if and how the content the smart hub has selected for presentation on display 111 is to be switched, when a plurality of users are present. In such a condition, each user may be a differing predicted preference for which content to play, and may have differing "priority" in consideration of the preference or their inputs by the smart hub.

428 depicts a universal remote control/local or connected device control (UDCM) module which in some embodiments provides for the translation of commands received from another sources (as IP packet application level messages for example form a SHAD (such as SHAD 114) and translates those commands or "macro" commands into one or more device appropriate IR or RF remote control commands to one or more devices to achieve a desired objective.

Such a process may, in some embodiments, include the use of feedback from the controlled devices to trigger specific repeated commands, or modified commands or command combinations. Such feedback may be achieved by monitoring a switch port interface (210, 212, or other source) for activity on audio or video content as described. Such a processes in one embodiment may further involve the utilization of source equipment interaction via communication channels utilizing Ethernet (including HEC as discussed), WiFi, Bluetooth, or the like. For example identifying a cable box is powered on by utilizing the HEC interface to ping specific addresses, or discover default gateway addresses for example.

429 depicts a home network security, policy, and guest (HNSPG) processing module which provides for the authorization and admittance of a guest and other users onto the a home or local network of which the SH 110 may be directly providing acting as a WiFi access point, or as an agent to another access point, able to interact with that wireless router to allow admittance/authorization, such as a RADIUS server interface to a WiFi router using EAP protocols as defined in the 802.11 and related standards. Such a process is described as an example in foregoing sections. In one embodiment, the SH 110 may act as a true layer 2 access point with no routing, relaying on a home network router it connected to the SH 110 as a DHCP server, and acting as a layer 2 bridge to the admitted devices. In other embodiments, the SH 110 may share credentials with the device for access to the network via an application on that device, or utilizing SMS, Bluetooth (BT), AirDrop®, or the like. In one embodiment, the SH acts as a radio authentication server to a home WiFi router, as mentioned, and configures the WiFi router utilizing Simple Network Management Protocol (SMNP) and standardized interfaces automatically utilizing the management interface password to configure the Access Point (AP) to perform enterprise security procedures with the SH 110 populating the credentials, based upon various factors, such as the device Media Access Control (MAC) address of the device to be admitted. The device MAC address, is communicated to the SH 110 via an application on the guest device, and admittance optionally approved by a SHAD 114 device in the process. A small application to send the MAC address to the SH may be provided to the guest device form an internet URL, or "Airdropped" from an IOS® device to another IOS device, or the like. Device discovery module 434 in one embodiment would then detect the guest device running the guest application (via BT beacons detected by the guest device, and established communications to the SH for the guest, or the SH detecting beacons form the guest application, or another process using wireless communication), passing the MAC address and other information in some embodiments, (users name, or device name, or other identifying information, a picture of the user taken by the application, etc.) which may be forwarded to a SHAD device such as SHAD 114 for approval. Upon approval the credentials are authorized within the AP (internal or external to the SH 110), and instructions are sent back to the guest application instructing them to select a specific network WiFi SSID, or is performed by the application itself automatically. Alternatively guest access may be provided via BT, or Bluetooth High-speed, or WiFi direct, and bridged to the local network.

430 depicts a decoding, encoding module (MP3, MP4, MPEG, AAC, etc.).

431 depicts a loyalty, coupons, rewards and stored value (LCRS) module.

432 depicts a sponsored advertisement module which may retrieve an inventory of sponsored advertisements from an ad server prior to or in reaction to a request, which may be based upon the identification of currently being viewed content (determined by media identification module 406 in one embodiment).

433 depicts a communications module.

434 depicts a device discovery module which may perform beacon or iBeacon detection, or beacon or iBeacon generation with one ore more UUIDs, or other identifiers. This module may also perform WiFi network discovery or the discovery of other communications networks, or configure the SH 110 to transmit detectable WiFi beacons for Wi-Fi direct, or to act as a Wi-Fi AP, or other communications protocol. Further, the module may support the Bonjour protocol or the like for the detection of two other devices on a location area network, or to advertise services available on the LAN.

435 depicts a stream reception and processing module provides for the reception of stream content which in some embodiments may include service such as Netflix, or the like, or streamed content form a UPnP device, or AirPlay, Chromecast or the like.

448 depicts a connection management module providing for the setting up and management of specific communications connections and any handover which may occur.

449 depicts a security authentication authorization (SAA) module which provides an alternative and more comprehensive embodiment of the process described in module 429, including intruder detection and "per role" access to network resources and content.

450 depicts a stream to remote device processing module which acts to allow the streaming of audio and/or video to a remote device which as for display on a SHAD 114, or playback on the headset jack of SHAD 114, and to aid in the timing synchronization of the audio played on the SHAD with the video displayed on the monitor 111, or on the SHAD screen, as discussed elsewhere utilizing time delay and equalization. In one example, the delay of the replayed audio to the audio jack of the SHAD 114 is measured as discussed, and the video the monitor 111 is delayed so as to synchronize the audio with the video. Other sources such as audio form device 112 may be synchronized as well, and utilize additional modules such as the audio processing module 453, sonic transmission and reception module 452, using procedures discussed previously.

451 depicts a general processing module.

452 depicts a sonic transmission and reception module which provides, in some embodiments, for the generation of audio waveforms which may be used to perform "ranging", sounding, equalization/channel estimation, and location processes as discussed, and may utilize approaches which provide for non-detectable signals such as those embedded within an audio signal, a phase modulated signal, a high frequency signals not detectable by the human ear, or the like. Other embodiments may generate signals which are detectable which may be sent a low levels, for longer durations in time, or only occasionally. Some waveforms were previously discussed. Module 452 may in the same or other embodiments, provide for the reception and processing of such signals, with transferred from another device that device having received the audio signal, or received in the SH 110 directly. Other embodiments may provide for the waveform generated to be passed to other devices such as a SHAD 114 for processing associated with reception at that device.

453 depicts an audio processing module which in various embodiments performs audio equalization, dynamic volume control, and the like ad discussed elsewhere.

437 depicts an application platform module which allows for the downloading of third-party applications, or simply downloadable applications to operate in a protected area, in one embodiment. Such applications may allow for unique or proprietary/confidential credential storage, protocols, transcoders, menu applications, and the like. Platform applications would be developed in one embodiment with a specific API to framework which interfaces with the Application platform module and isolate the platform applications form underlying changes, and enforces policy and security. The following are some example platform applications, which in other embodiments may be so-called native applications:

438 depicts Google services interaction.
439 depicts Microsoft services interaction module.
440 depicts Twitter interaction module.
441 depicts Shazam interaction module.
442 depicts Hulu interaction module.
443 depicts Yahoo interaction module.
444 depicts Lastpass interaction module.
445 depicts Facebook interaction module.
446 depicts Amex interaction module.
447 depicts Amazon interaction module.
454 depicts Netflix interaction module.
455 depicts Skype interaction module.
456 depicts Pandora interaction module.
457 depicts Square interaction module.
458 depicts Paypal interaction module.
459 depicts other interaction modules.
460 depicts Chromecast interaction module.
461 depicts iCloud interaction module.
462 depicts BOA interaction module.
463 depicts Visa interaction module.

Figure 5:
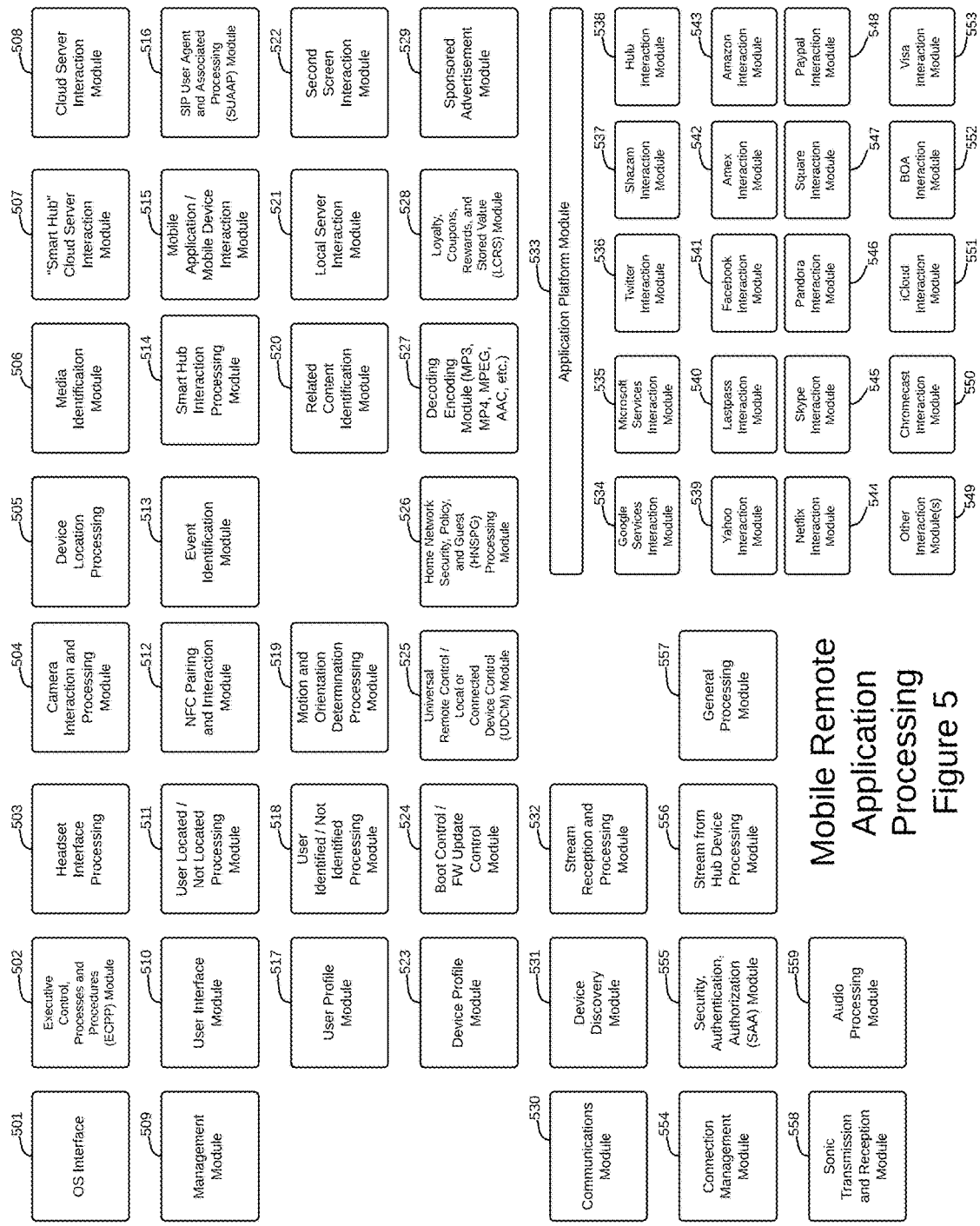
FIG. 5 is an example software/firmware architecture functional partitioning diagram of the processing performed in an embodiment of a mobile device smart hub remote control/interface application (resident on an embodiment of a smart hub application device—SHAD).

FIG. 5 is an example software/firmware architecture functional partitioning diagram of the processing performed in an embodiment of a mobile device smart hub remote control/interface application (resident on an embodiment of a smart hub application device—SHAD).

Referring now to FIG. 5, example software and/or firmware architectures of an embodiment of a mobile remote application residing on a SHAD device 114 are depicted. In the present diagram no interconnections between the modules are shown, however interconnections between any and all of the depicted or assumed and not depicted functional modules is contemplated. In specific embodiments, a subset of interconnections may be present to effect specific functional processing and data flows. Some specific modules related to hardware or software drivers or other interfaces or required functional support modules may not be shown but are contemplated and omitted for the sake of clarity, as such modules are commonly known in the industry to one skilled in the art. It is further contemplated that embodiments of one or more of the depicted or implied modules may be combined together to form other functional modules, or described or implied modules may be partitioned into modules of more granularity, or both. Regardless, the specific functional partitioning of the depicted embodiment is not intended to be limiting, but rather to be illustrative and other equivalent partitioning(s) are in the scope of embodiments described herein, having the same, more, or fewer functional modules and including all or a portion of the described functional modules in specific embodiments. The responsibilities and embodied functions of the specific depicted modules are well understood to one skilled in the art, based upon the names of the modules themselves, in view of the examples descriptions of specific embodiments elsewhere in this disclosure. Therefore, only specific modules will be described as useful in the description of specific embodiments. To the extent the names of the specific modules of FIG. 5 are similar to those of FIG. 4, in some embodiments these modules would act in a similar manner. In other embodiments, and where appropriate, similarly named modules would act as a counterpart to the modules on the SH 110 and to interact with their counterparts so as to achieve a specific objective, in a complimentary approach.

Mobile Remote Application Processing (FIG. 5)

501 depicts an OS interface module that provides for interfacing to the operating system of the SHAD 114 device, such as interfacing with android, IOS, Linux, or the like.

502 depicts an executive control processes and procedures (ECPP) module.

503 depicts headset interface processing which is received from, in one embodiment, the stream to remote device processing module 450 (either directly or indirectly).

504 depicts a camera interaction and processing module.

505 depicts device location processing which in some embodiments works in coordination with location processing on the SH 110 and location processing module 405, sonic transmission and reception module 558, and other modules.

506 depicts a media identification module.

507 depicts a "Smart hub" cloud server interaction module.

508 depicts a cloud server interaction module.

509 depicts a management module.

510 depicts a user interface module.

511 depicts a user located/not located processing module.

512 depicts an NFC pairing and interaction module.

513 depicts an event identification module.

514 depicts a smart hub interaction processing module.

515 depicts a mobile application/mobile device interaction module.

516 depicts an SIP user agent and associated processing (SUAAP) module provides for a SIP protocol user agent functionality allowing for VoiP calls, video and presence applications, as well as IMS related services.

517 depicts a user profile module.

518 depicts a user identified/processing module.

519 depicts a motion and orientation determination processing module.

520 depicts a related content identification module.

521 depicts a local server interaction module.

522 depicts second screen interaction module.

524 depicts a device profile module.

525 depicts a universal remote control/local or connected device control (UDCM) module which provides for interacting with the SH 110 using WiFi LAN messaging or BT communications so as to send instructions and receive feedback to and from the associated universal remote control/local or connected device control (UDCM) on the SH 428, and as discussed further elsewhere herein. Additionally 525 is capable, in specific embodiments, of interacting with the SHURE 120 and like devices allowing for universal IP and RF control from the SHAD device 114, either from the SH, or from the SHURE 120, or a combination of the two.

526 depicts a home network security, policy, and guest (HNSPG) processing module that provides complimentary processes to the SH 110, and the associated module as discussed.

527 depicts a decoding encoding module (MP3, MP4, MPEG, AAC, etc.).

528 depicts a loyalty coupons, rewards, and stored value (LCRS) module.

529 depicts a sponsored advertisement module.

530 depicts a communications module.

531 depicts a device discovery module.

532 depicts a stream reception and processing module.

533 depicts an application platform module.

534 depicts a Google services interaction module.

535 depicts a Microsoft services interaction module.

536 depicts a Twitter interaction module.

537 depicts a Shazam interaction module.

538 depicts a Hulu interaction module.

539 depicts a Yahoo interaction module.

540 depicts a Lastpass interaction module.

541 depicts a Facebook interaction module.

542 depicts an Amex interaction module.

543 depicts an Amazon interaction module.

544 depicts a Netflix interaction module.

545 depicts a Skype interaction module.

546 depicts a Pandora interaction module.

547 depicts a Square interaction module.

548 depicts a PayPal interaction module.

549 depicts other interaction module(s).

550 depicts a Chromecast interaction module.

551 depicts an iCloud interaction module.

552 depicts a Bank of America (BOA) interaction module.

553 depicts a Visa interaction module.

554 depicts a connection management module.

555 depicts a security authentication authorization (SAA) module.

556 depicts a stream from Hub device processing module.

557 depicts a general processing module.

558 depicts a sonic transmission and reception module.

559 depicts an audio processing module.

Figure 6:
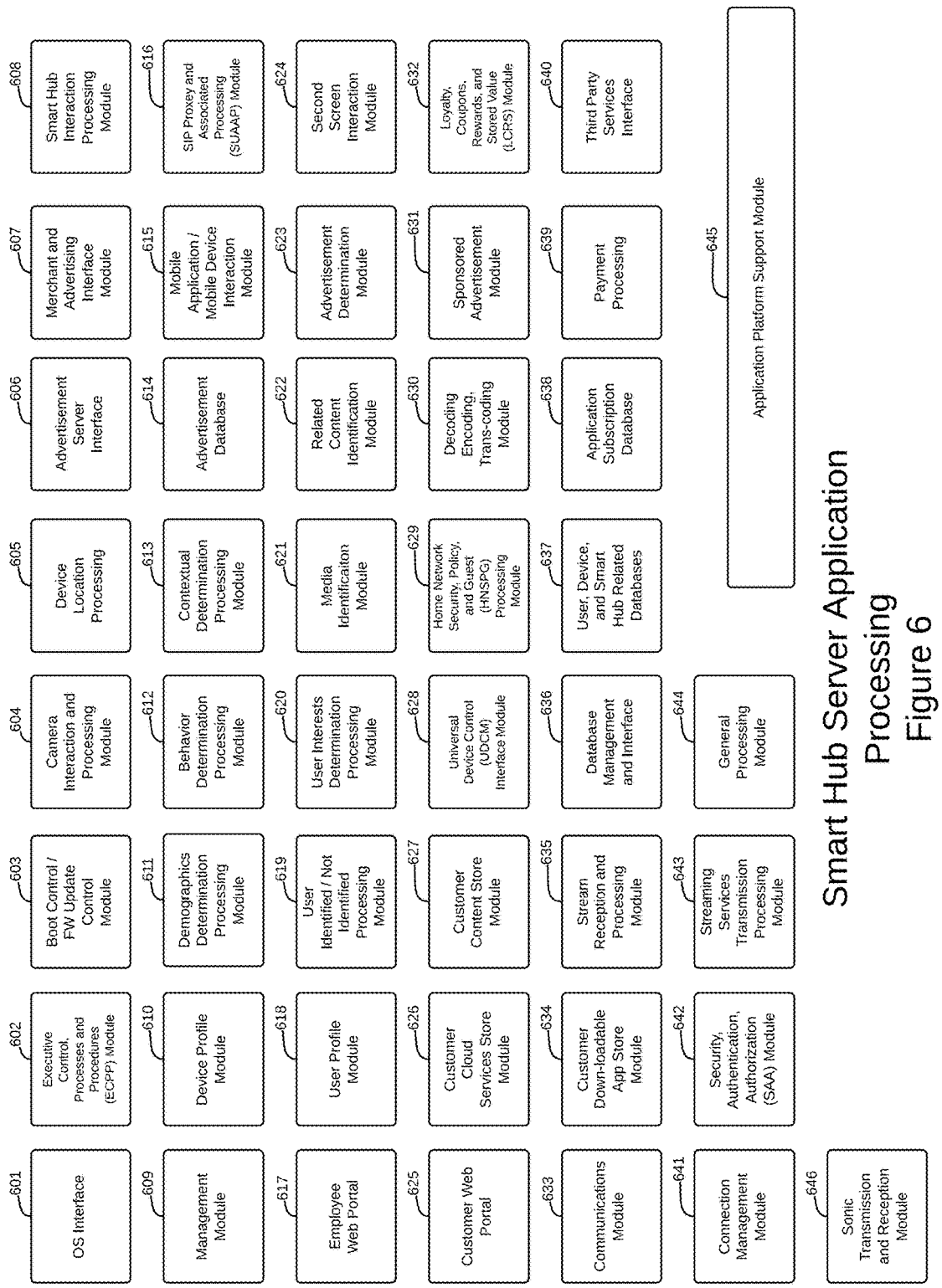
FIG. 6 is an example software/firmware architecture functional partitioning diagram of the processing performed in an embodiment of a mobile device smart hub server application.

FIG. 6 is an example software/firmware architecture functional partitioning diagram of the processing performed in an embodiment of a mobile device smart hub server application.

Referring now to FIG. 6, example software and/or firmware architectures of an embodiment of a smart hub cloud server (SHCS) 103 are depicted. In the present diagram no interconnections between the modules are shown, however interconnections between any and all of the depicted, or assumed and not depicted, functional modules is contemplated. In specific embodiments, a subset of interconnections may be present to effect specific functional processing and data flows. Some specific modules related to hardware or software drivers or other interfaces or required functional support modules may not be shown but are contemplated and omitted for the sake of clarity, as such modules are commonly known in the industry to one skilled in the art. It is further contemplated that embodiments of one or more of the depicted or implied modules may be combined together to form other functional modules, or described or implied modules may be partitioned into modules of more granularity, or both. Regardless, the specific functional partitioning of the depicted embodiment is not intended to be limiting, but rather to be illustrative and other equivalent partitioning(s) are in the scope of embodiments described herein, having the same, more, or fewer functional modules and including all or a portion of the described functional modules in specific embodiments. The responsibilities and embodied functions of the specific depicted modules are well understood to one skilled in the art, based upon the names of the modules themselves, in view of the examples descriptions of specific embodiments elsewhere in this disclosure. Therefore, only specific modules will be described as useful in the description of specific embodiments.

For example if the switcher does not have a clear switch decision, it may invoke the switcher control application on the user's device, but may not invoke it when it is not required.

Smart Hub Server Application Processing (FIG. 6)

601 depicts an OS interface.

602 depicts an executive control, processes and procedures (ECPP) module.

603 depicts a boot control/FW update control module.

604 depicts a camera interaction and processing module.

605 depicts device location processing.

606 depicts an advertisement server interface.

607 depicts a merchant and advertising interface module.

608 depicts a smart hub interaction processing module.

609 depicts a management module.

610 depicts a device profile module.

611 depicts a demographics determination processing module.

613 depicts a behavior determination processing module.

614 depicts an advertisement database.

615 depicts a mobile application/mobile device interaction module.

616 depicts an SIP Proxy and associated processing (SUAAP) module.

617 depicts an employee web portal.

618 depicts a user profile module.

619 depicts a user identified/not identified processing module.

620 depicts a user interests determination processing module.

621 depicts a media identification module.

622 depicts a related content identification module.

623 depicts an advertisement determination module.

624 depicts a second screen interaction module.

625 depicts a customer web portal.

626 depicts a customer cloud services store module.

627 depicts a customer content store module.

628 depicts a universal device control (UDCM) interface module.

629 depicts a home network security, policy, and guest (HNSPG) processing module.

630 depicts a decoding encoding, trans-coding module.

631 depicts a sponsored advertisement module.

632 depicts a loyalty, coupons, rewards and stored value (LCRS) module.

633 depicts a communications module.

634 depicts a customer down-loadable app store module.

635 depicts a stream reception and processing module.

636 depicts a database management and interface.

637 depicts a user, device and smart hub related databases.

638 depicts application subscription databases.

639 depicts payment processing.

640 depicts a third party services interface.

641 depicts a connection management module.

642 depicts a security, authentication authorization (SAA) module.

643 depicts a streaming services transmission processing module.

644 depicts a general processing module.

645 depicts an application platform support module.

646 depicts a sonic transmission and reception module.

FIG. 7A is an example flow diagram of a smart hub application device (SHAD) embodiment detecting the presence of a smart hub (SH) or a related devices (such as a smart but universal remote extender, or the another device) an invoking an embodiment of a smart hub interface application.

FIG. 7B is an example system level flow diagram of a smart hub system embodiment wherein a user with a smart hub application device (SHAD) embodiment comes into range of a smart hub embodiment to perform example services.

FIG. 8 is an example system level flow diagram of a smart hub embodiment performing a embodiment of a source switching process.

FIG. 9A is an example Illustration of SH system utilizing combined Acoustic and RF Processing to determine information related to the SHAD device embodiment.

FIG. 9B is an example system flow diagram a smart hub system process embodiment utilizing combined Acoustic and RF Processing for the determination of Acoustic channel state information (CSI) (one or more of: presence in a specific area presence, location (proximal or absolute), acoustic channel equalization, spatial equalization, and the like).

Figure 10:
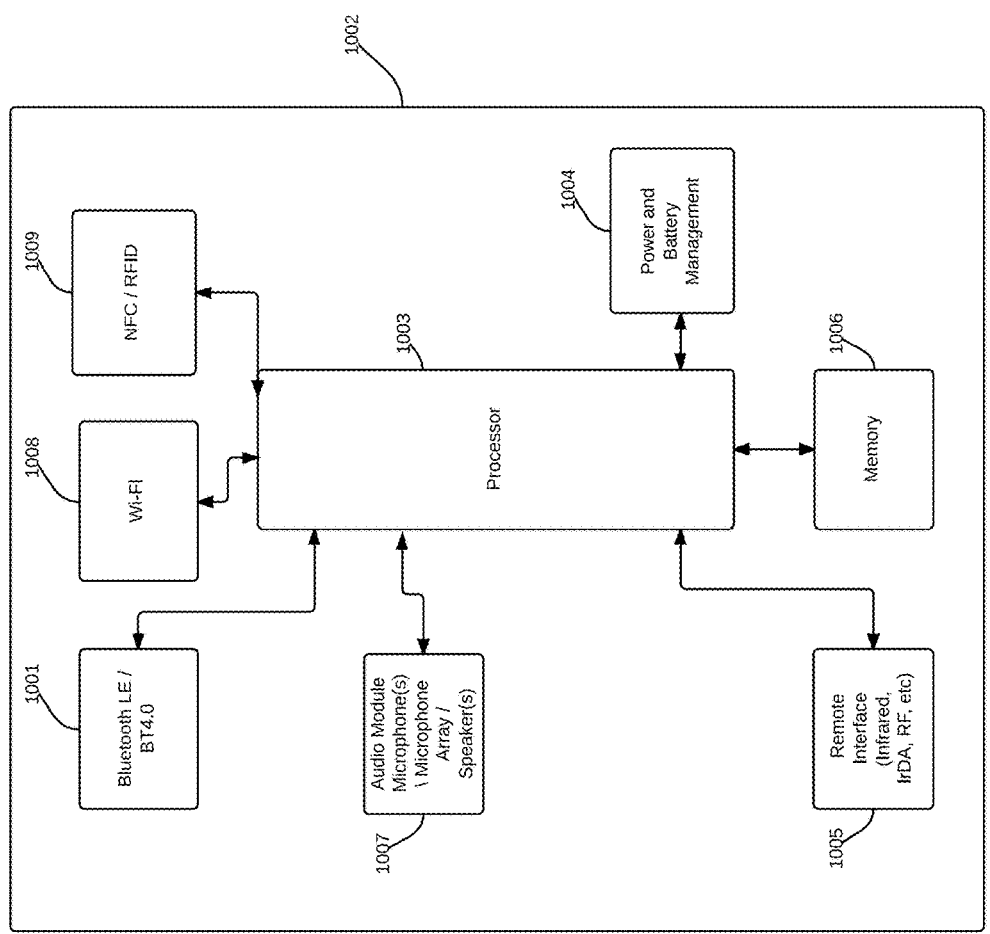
FIG. 10 is an example block diagram Smart Hub Universal Remote Extender (SHURE) embodiment (allowing for a smart hub to provide IR control (or other control) to controllable devices providing content sources to the switchable ports of a smart hub, when such devices are not directly controllable by resources internal to the smart hub components), in one embodiment.

FIG. 10 is an example block diagram of a Smart Hub Universal Remote Extender (SHURE) 120 embodiment (allowing for a smart hub to provide IR control (or other control) to controllable devices providing content sources to the switchable ports of a smart hub, when such devices are not directly controllable by resources internal to the smart hub embodiment components), in one embodiment.

As previously discussed above, associated with FIG. 10 is a Universal Remote Extender 120, using the smart hub extender as a stand-alone device with an application on the smartphone to act as a universal remote control device.

Further details of the depicted modules and components are as follows:

1.1. Smart Hub may be a "smart" HDMI switch using video analysis to determine which stream to connect to monitors audio and or video to determine what is being watched.

connects to home WiFi network and to the cloud can "broadcast" audio to remote speakers will delay the primary video and audio to ensure synchronized audio at the remote speakers may have a integrated speaker to "hear" the delay differences and delay adjust them.

can perform "room equalization" based upon deterred auto from integrated mic, mic array, or microphones in remote speakers, or in smart phone applications a smart phone application can be used to transmit signal from the local smart phone to the cloud or HDMI box (a smart hub which receives one or HDMI inputs or other local intermediary device using some other equivalent interface) to perform synchronization/equalization, can also be used for "finger printing what is being watched.

mic and WiFi or BT can be integrated into a remote with the same functionality as above.

can put a speaker in a couch pillow for example, or other object can perform "local" equalization functions.

remote can be used to provide headset jack for TV audio, with delay sync to video.

geometry of the room can be deterred as well.

send audio via WiFi between the phone app and the HDMI box, and phone can provide feedback to equalize delay to smartphone app such that video matches audio in terms of delay synchronization can use phone speaker phone as well to augment the in room audio use smartphone app to manually switch between HDMI connections Equalization performed via inaudible embedded signals, realtime look at embedded phase modulated signals look at low level signals also use finger printed and identified shows to send information to the phone for marketing and advertisement purposes can use the signal in the HDMI signal to determine what shows are being watched augments the video to display on screen information from the cloud based upon what the phone app is doing and used input is user configurable 1.1.1. Interacts with a special purpose remote device 1.1.2. Interacts with an application on a smart phone (iPhone 5s, Android device, etc.)

1.1.2.1. transmits beacons or other indications (over 802.11, BT, BTLE, LAN, etc.)

1.1.2.2. may use Bonjour protocol over LAN 1.1.2.3. Causes the invocation of an application on a iPhone (in one example) based upon the detection of an iBeacon 1.1.2.3.1. An app is loaded onto an iOS device and registers a proximity UUID with the OS 1.1.2.3.2. upon detection of the iBeacon, the app is invoked in the background 1.1.2.3.3. depending upon the scenario different actions may be taken 1.1.2.3.3.1. a push notification may be sent to the user to allow them to bring the application to the fore ground 1.1.2.3.3.2. communications with the SH or the SH server may be established, renewed, or otherwise processed 1.1.2.3.3.3. spending upon the state of the interaction with the user of the device, different screens may be presented, and different actions taken by SH and/or SH Server 1.1.2.3.3.4. SH may attempt to location the user as:

1.1.2.3.3.4.1. being in the room using acoustics 1.1.2.3.3.4.2. location the user specifically within the room using acoustics 1.1.2.3.3.4.3. locate the user (the device) within the room using BTLE ranging to one or more devices in a coordinated approach 1.1.2.3.3.4.3.1. using SH remote extender beacon ranges reported form the application or vice versa for example 1.1.2.3.3.4.3.2. a combination of acoustic and BTLE approaches 1.1.3. May include "universal remote" capabilities 1.1.3.1. controls other devices using IR or RF remote know remote control protocols 1.1.3.1.1. Can control other devices directly by IR or RF remote control standards 1.1.3.1.1.1. Can use BT or BTLE to control the other source devices if possible 1.1.3.1.1.2. Can use 802.3 or 802.11 variants to control the other devices 1.1.3.1.1.3. Can use IF (including IrDA standards)

1.1.3.1.1.4. Any other interfaces are contemplated as well.

1.1.3.1.2. Coordinate the universal remote control operation with the content source selection operation 1.1.3.1.3. Interface with "remote extender devices to control other items"

1.2. Can "Learn" Behaviors

After long pauses, which input get watched most often?

based upon time of day, when turned on.

"watch the inputs" and time of day, and other factors such as which devices are detected in proximity.

which inputs have audio or video active (as a voltage, or with "moving" content), and only change when something has happened, qualify an "event" as a duration in time as well, in some embodiments.

learn which devices are "always active" and which ones start moving before switching to it. i.e. past behavior of their "pre-switch" condition—to increase the "probability" a switch should occur.

use Bluetooth, or WiFi proximity of one or more devices to help determine who is watching, and qualify the rules (or probabilities of switching).

use "beacon" like features to transmit beacons from the device to phones.

use this to invoke an app on the phone in "invisible" mode, with no prevention to the user necessarily use beacon to invoke a visible UI or other display to the user.

use inputs on the phone to influence switching or switching preferences.

use the touch screen use "movement of the phone" to make the change.

use the "invoked" app on the phone to perform "second screen" functions to socially interact with other users watching the same content (or listening)

use twitter or Facebook, or other social site with the second screen app.

take polls — push or display offers and advertising send information via twitter alone send information via sms, iMessage, google messaging, and the like.

send emails to the phone only push content when the device is detected via iBeacon like approaches.

forced automatic switch by turning an input device off, then back on again add simple input to the device to force a manual switch.

a button a speaker input with qualified sound signature

"clapper" input.

speech recognition implemented in the smart hum implemented in the smart phone application implemented in the SH server in the application on the smartphone, utilizing system resources such as Siri from Apple (to generate a test message to the device, to return a message)

using gestures to control the innovate of the app or the manual selection of the source port, other actions, or confirmation of the suggested port (such as tapping the phone to confirm switching from one source to another)

A message

BT message or signal

WiFi/ethernet carried message
a receiver SMS to a specific address of a plurality of addresses
for example . . . one SMS phone number, or messaging address, or sip address, etc., iMessage, IM, IMCP, XMPP, yahoo messages, google messenger, etc., address for each desired device to switch to.
all the messages being received by the same device, the device responsive to a plurality of addresses.
qualify the switch based upon it being sent from a specific address, or device.
prioritize the from addresses, allowing for protection from override, or to allow for an override of other inputs form other addresses.
The preceding overage aspects, and authorization from address aspects, but with a single destination address, but with content determining the "switch to" device
message to device with contents "TV" or "1" or "DVR" where the content is interpreted based upon one or more of:
a name associated with a port (hdmi port for example)
a number of the port.
1, 2, 3 . . . A, B, B . . .
including in the message a name associated with the port
the device storing that name, and the using the name in future messages to allow for switching
first message switch ("1 TV")
second message switch ("tv")
third message switch ("Wii")
generating the message from a phone using a Siri like interface,
"Siri, new message to xxx (switchie for example) TV")
the type of port it is . . . message (HDMI), USB, MHT,
storing the names in the cloud or at a server, and generating a standard message to the device.
the above messaging implementations, but received by a server which modifies a message, or generates a new message to the device to perform the desired function
1.3. A Server
which backs up the settings from the device, which is connected.
which receives "audio or video" samples and identifies the content being watched
transporting the "samples" as coded information—reconstructable
encoding or hashing the content in a non-reconstructable was so as to allow for intensification, but not necessarily recreation
performing the identification of the shows or audio content locally on the device based upon downloaded "signatures" to hashed content information
performing the identification on the server
identifying the content based upon information encoded with tin the content steam itself such as metadata, or information packets, or digital channel guide information, or interacting with the content providing devices itself (Ethernet, or HDMI interaction)
performing the "switching" over the same physical interface, but between difference constant sources . . . for example over ethernet/wifi from two difference streaming sources . . . Netflix, Hulu, amazon prime video or a DVR with a digital interface.
sending switch signals to a content providing device over HDMI upstream link.
requesting channel guide information from the device and receiving it.
interacts with a consumers device based pun collected information form the switcher device.
performs the punching directly, or indirectly, for example via the switcher device.
configures the switcher
learns and updates setting on the switcher based on information from the switcher or from a users device, or a web portal associated with the service
the device or the server determining when specific ports have been switched.
provides for payment/authorization and enablement of new services on the device (any other the service in the below may be non-conditional services as well)
WiFi credential sharing to new devices wanting to come onto the network for example
content filtering and not allowing for switching to that content. (parental rules for example)
audio processing (audio "room equalization" for example
providing display services, picture in picture, "commercial identification" and switching back when the commercial is over.
secondary show or "standby" show watching during commercials.
invoking a DVR input during an identified period (such as before a show starts, or during a commercial)
switching to the DVR input, and controlling the DVR to play during the duration of the commercial
keeping a PIP of the primary show on the screen to allow for manual switch back.
primary DVR of a short period of time, to allow for correction of mistakes in switchback to primary.
catchup for real time at the next commercial period
playing Wii or another video game during the commercial period.
switching to a "social media" or other related content—similar to the mobile device "second screen" display for the commercial period times.
Providing for a display "overlay"
at the control of the switcher device, and added to the selected input (for commercial switch for example)
for social interaction display—twitter trending
for directions to associate a device
for configuration . . .
Provide for
A platform in the switcher (or other) device which allows for the downloading or enablement of specific service
based upon any event or condition . . . start or stop the transmission of iBeacons (or other beacons) at the switcher device, and
for example if the switcher does not have a clear switch decision, invoke the switcher control application on the user's device, but don't invoke it when it is not required.
have multiple invokable screen on the users device.
switcher control
second screen services
configuration service
cloud interface
service interface
advertising interface
offers interface
incentives interface
add loyalty to an account associated with the switcher and or one or more mobile devices or an individual or group of individuals
tweet or other input on the mobile device, get points, or rewards redeem points for rewards such as product coupons, discounts,
  enhanced services on the switcher or within the cloud service
  badges, which are bragging rights aspects
add audio muting or switch over for commercials and commercial detection, or other events. add other audio source switchover as a "secondary audio input during commercials. such as music from other inputs, for example streaming form the internet, from other HDMI inputs, Airplay, uPnP, other wireless sources (BT, WiFi), other inputs—optical, RCA, audio jack, etc.
stream audio discussion from Pandora, Spotify, etc.
control the inputs via signaling such as pause while the primary show is on.
use a simple input to invoke the switch, from a smartphone, from "clapping" or other audio input, or other "touch" input on the device itself (or a button)
stream content related to the TV content (or other content) being watched.
performing video or audio analysis based upon past statistics (audio level change for example) to determine the commercial time periods (or other time periods of interest).
based upon input designating a commercial or a show period, analyzing collected information to refine the commercials or "'secondary' time period" period selection. for example, storing a running average audio level, and upon input "this is a commercial" determining the interval over which the period is consistent based upon the audio or other ongoing information (images, blackouts, etc.), then categorizing statistics related to the tie periods and for time periods not designated as commercial (or designated as not commercial) ad setting up, or refining the rests.
general audio "leveling" i.e. no excessive loud or soft sounds using a audio AGC approach, aid in the approach for folks which some hearing loss, and amplify the audio, but dynamical adjust it, so as to prevent excessive volume deviations (prevent the wife from being woken up, no excessively loud explosions).
identifying specific types of sounds such as those not suitable for children—cure words/profanity/explicit, and lowering volume during those short periods.
(allowing parents to watch a movie with sleeping kids).
blanking video during inappropriate scenes having been detected, or switching to another source, or modify the image so as to "cover" inappropriate images (automatic censoring),
content filtering prevention . . . physically lock the device to the TVs HDMI input in one embodiment, detect the rating or other aspects of the content and prevent it from being displayed
display a message, and/or
shane to other content
blank screen and display a message
potentially with Picture picture.
wifi "security" guardian . . .
  using BT to connect a device to the box, or a WiFi AP signal
  request connection to the WiFi network
  using the app on the device to configure WiFi for the visiting device (enterprise or regular security) with guest access to local resources, or other levels of access.
  the device passing credentials to the visiting device via BT, or via WiFi direct, or beacons.
1.4. Remote Extender 1.4.1. interfaces with the SH using Bluetooth for example
1.4.2. is detected by (or visa versa) BT beacons, in one example, by SH to be associated with it, and or the SH Application on the SHAD (smart hub application device)
1.4.3. receives the infrared (IR) commands via BT and generates the IR commands to control the target device
  1.4.4. can receive IR command via IR, and forward them, but BTLe or standard BT may be better for indirect communications and then IR for control.

What is claimed is:

1. An intelligent hub for communicating with a mobile device comprising:
  a Bluetooth radio for transmitting Bluetooth beacons;
  a signal generator for providing a plurality of audio information signals;
  an audio information interface for providing the plurality of audio information signals for use in the generation of respective acoustic signals by a plurality of respective loudspeakers; and
  a processor configured to:
    provide beacon information to the Bluetooth radio,
    provide the plurality of audio information signals to the audio information interface, wherein each of the audio information signals comprises a respective unique sounding signal and respective media content at the same time,
    determine that the mobile device is proximal to the intelligent hub, based upon both (a) the mobile device detecting at least one of the Bluetooth beacons and upon (b) the detection of the respective unique sounding signals,
    wherein the respective unique sounding signals are utilized to determine a plurality of respective channel impulses or channel frequency responses of the acoustic channels between each respective loudspeaker and the mobile device, and
    perform acoustic equalization on each of a plurality of subsequent audio signals provided to the plurality of respective loudspeakers, based, at least in part, upon the determined plurality of respective channel impulses or channel frequency responses.

2. The intelligent hub of claim 1 wherein each of the plurality of loudspeakers is co-located with at least one associated microphone.

3. The intelligent hub of claim 2 where the respective sounding signals broadcasted from each loudspeaker are detected by the associated microphones of each respective other loudspeakers of the plurality of loudspeakers.

4. The intelligent hub of claim 2 wherein the detection of the respective sounding signals by each of the associated microphones allow for the determination of a relative geometrical distance between at least two of the plurality of loudspeakers.

5. The intelligent hub of claim 4 wherein the acoustic signals are detected at the mobile device, and are used in combination with the relative geometrical distance between at least two of the plurality of loudspeakers to determine position information related to the mobile device.

6. The intelligent hub of claim 1, wherein the respective sounding signals comprise one or more of Orthogonal Frequency Division Multplex (OFDM) codes, Zadoff-Chu codes, CAZAC codes, Walsh codes, barker codes, and CCK codes.

7. The intelligent hub of claim 1, wherein the processor is additionally configured to:

determine a propagation delay from the acoustic channel propagation characteristics between each respective loudspeaker and the mobile device.

8. The intelligent hub of claim 7, wherein the unique sounding signals are respective acoustic signals and are inaudible signals embedded in other audio signals broadcast by the respective speakers.

9. The intelligent hub of claim 7, wherein the processor is further configured to:
orthogonalize subsequent audio signals broadcast by the loudspeakers using the acoustic channel propagation characteristics between each respective loudspeaker and the mobile device.

10. The intelligent hub of claim 1 wherein related information is communicated to the mobile device including content information based on profile settings and media content available to the intelligent hub.

11. The intelligent hub of claim 1 wherein each unique sounding signal is correlated with known reference versions of the sounding signals to determine each respective channel impulse or channel frequency response of the acoustic channel.

12. The intelligent hub of claim 1 wherein each unique sounding signal is a source signal, and the source signals for each speaker are orthogonal signals allowing for the separation of each in a received collected signal at the mobile device.

13. The intelligent hub of claim 1 wherein each unique sounding signal is a respective source signal associated with a respective orthogonal code.

14. The intelligent hub of claim 13 wherein each respective orthogonal code is utilized for the separation of a respective acoustic channel state information from that of other simultaneously transmitted source signals having respective other orthogonal codes, from within the received collected audio signal detected at a microphone at the mobile device.

15. The intelligent hub of claim 1 wherein each unique sounding signal is associated with a individually detectable respective orthogonal code within a received collected audio signal at the mobile device.

16. The intelligent hub of claim 15, wherein the received collected audio signal at the mobile device comprises acoustic channel state information for each acoustic channel between each loud speaker associated with each respective sounding signal at the mobile device.

17. An intelligent hub for communicating with a mobile device comprising:
a Bluetooth radio for transmitting Bluetooth beacons;
a signal generator for providing a plurality of audio information signals;
an audio information interface for providing the plurality of audio information signals for use in the generation of respective acoustic signals by a plurality of respective loudspeakers; and
a processor configured to:
provide beacon information to the Bluetooth radio,
provide the plurality of audio information signals to the audio information interface, wherein each of the audio information signals comprises a respective unique audio code and respective media content at the same time, and
determine that the mobile device is proximal to the intelligent hub, based upon both (a) the mobile device detecting at least one of the Bluetooth beacons and upon (b) the detection of the respective unique sounding signals,
wherein the processor is further configured to:
maintain information concerning a geometry of speaker arrangement in a room,
when there are two or fewer speakers in the room,
resolve location ambiguity using both the acoustic signal and Bluetooth beacon, and
when a geometry of the speaker arrangement is not known,
determine whether the user is in the room by comparing the result of Bluetooth beacon ranging and detection of at least one acoustic signal which is known to not propagate through walls of the room.

18. The intelligent hub of claim 17 additionally wherein
each of the audio information signals further comprises a respective media content at the same time as the each of the respective unique sounding signals;
the respective unique sounding signals are utilized to determine a plurality of respective channel impulses or channel frequency responses of the acoustic channels between each respective loudspeaker and the mobile device; and
the processor is further configured to:
perform acoustic equalization on each of a plurality of subsequent audio signals provided to the plurality of respective loudspeakers, based, at least in part, upon the determined plurality of respective channel impulses or channel frequency responses.

* * * * *